(12) United States Patent
Hampel et al.

(10) Patent No.: US 11,483,731 B2
(45) Date of Patent: Oct. 25, 2022

(54) CONFIGURATION FOR PACKET FORWARDING ON WIRELESS BACKHAUL

(71) Applicant: QUALCOMM Incorporated, San Diego, CA (US)

(72) Inventors: Karl Georg Hampel, Hoboken, NJ (US); Junyi Li, Chester, NJ (US); Navid Abedini, Somerset, NJ (US); Jianghong Luo, Skillman, NJ (US); Tao Luo, San Diego, CA (US); Luca Blessent, Whitehouse Station, NJ (US)

(73) Assignee: QUALCOMM Incorporated, San Diego, CA (US)

(*) Notice: Subject to any disclaimer, the term of this patent is extended or adjusted under 35 U.S.C. 154(b) by 247 days.

(21) Appl. No.: 16/990,454

(22) Filed: Aug. 11, 2020

(65) Prior Publication Data

US 2021/0051512 A1 Feb. 18, 2021

Related U.S. Application Data

(60) Provisional application No. 62/886,544, filed on Aug. 14, 2019.

(51) Int. Cl.
*H04W 28/02* (2009.01)
*H04W 40/22* (2009.01)
(Continued)

(52) U.S. Cl.
CPC ....... *H04W 28/0263* (2013.01); *H04W 40/22* (2013.01); *H04W 80/02* (2013.01); *H04W 84/047* (2013.01)

(58) Field of Classification Search
CPC . H04W 28/0263; H04W 40/22; H04W 80/02; H04W 84/047
See application file for complete search history.

(56) References Cited

U.S. PATENT DOCUMENTS

2019/0223078 A1    7/2019  Sirotkin et al.
2020/0245223 A1*   7/2020  Cheng ................... H04L 45/745

FOREIGN PATENT DOCUMENTS

CN    111757387 A   * 10/2020   ........ H04W 28/0263
WO    2019142064 A1    7/2019
WO    WO-2020151648 A1 *  7/2020   ........... H04L 1/1685

OTHER PUBLICATIONS

International Search Report and Written Opinion—PCT/US2020/045862—ISA/EPO—dated Oct. 29, 2020.

* cited by examiner

*Primary Examiner* — Saad A. Waqas
(74) *Attorney, Agent, or Firm* — Procopio, Cory, Hargreaves & Savitch, LLP

(57) ABSTRACT

Aspects of the present disclosure are regarding configuring an Integrated Access and Backhaul (IAB) node of an IAB network to handle forwarding of packets from another device as well as packets originating in the IAB network at the IAB-node. An example method includes retrieving, by a Backhaul Adaptation Protocol (BAP) layer of the IAB-node, a packet from an upper layer or a Radio Link Control (RLC) layer of the IAB-node. The method also includes determining an egress RLC channel of an egress backhaul (BH) link with a second device for transmitting the first packet based on a first configuration in response to retrieving the first packet from the RLC layer or a second configuration in response to retrieving the first packet from the upper layer. The method also includes transmitting the first packet to the second device via the egress RLC channel of the egress BH.

84 Claims, 17 Drawing Sheets

(51) Int. Cl.
*H04W 84/04* (2009.01)
*H04W 80/02* (2009.01)

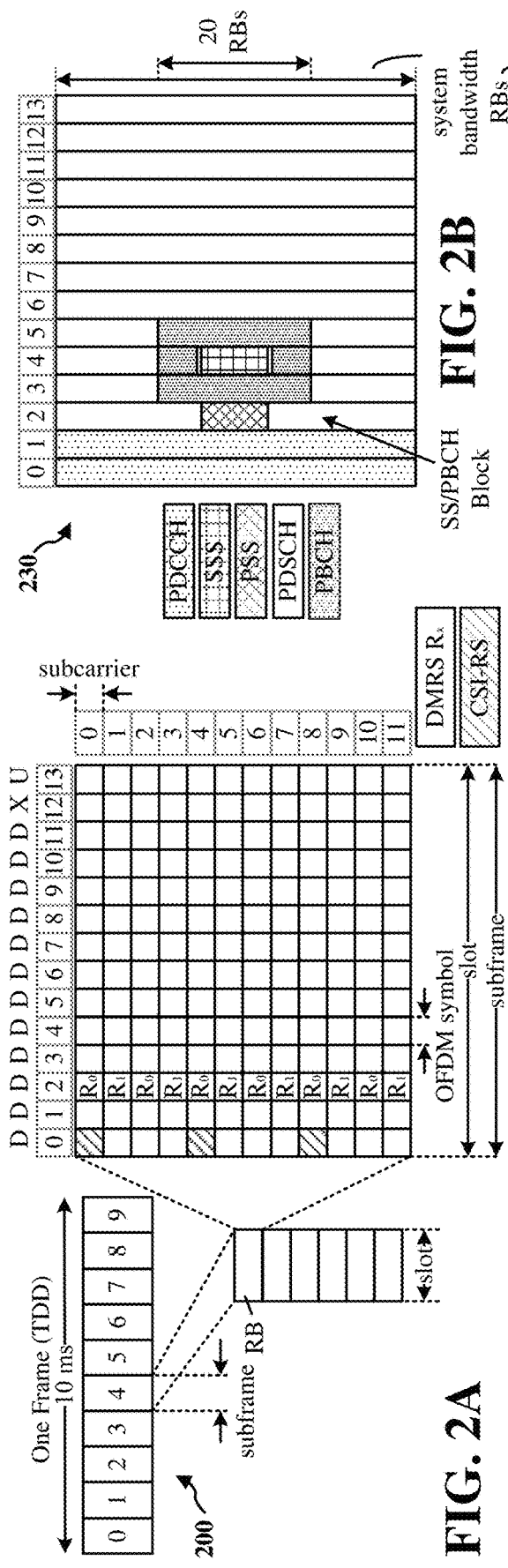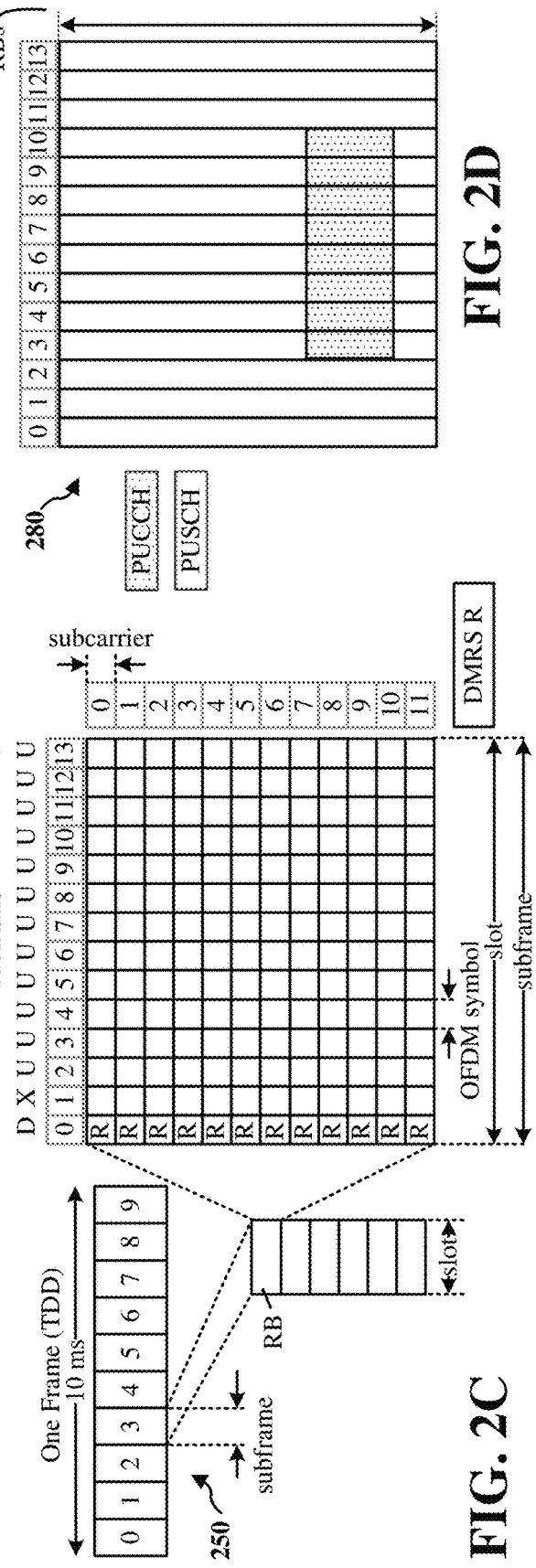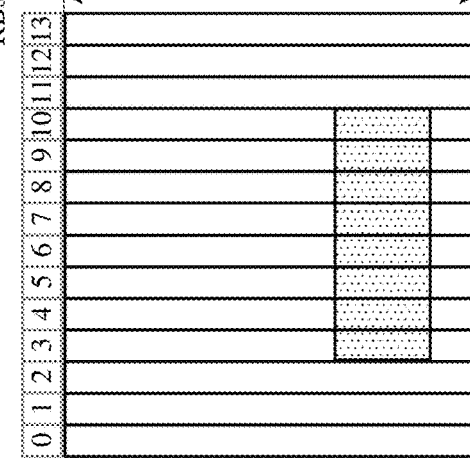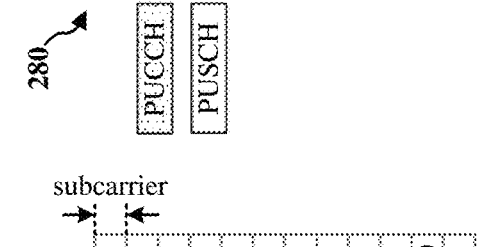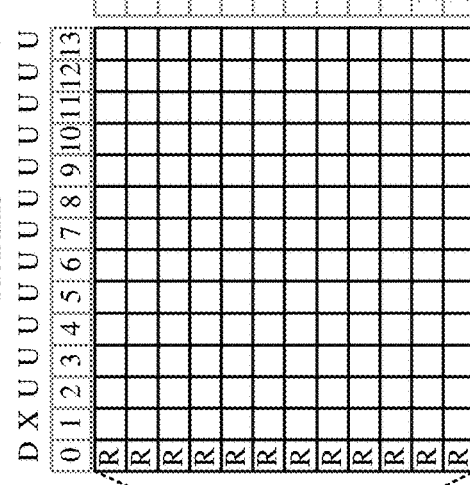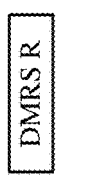

| INPUT | | OUTPUT | | |
|---|---|---|---|---|
| Traffic Specifier 1002 | | BAP Routing ID 1008 | Egress BH Information 1014 | |
| Traffic Type 1004 | Traffic ID 1006 | BAP address 1010 / BAP path ID 1012 | BH Link 1016 | RLC channel 1018 |
| Entry 1020A | | Mapping 1022A | | |
| Entry 1020B | | Mapping 1022B | | |
| Entry 1020C | | Mapping 1022C | | |
| Entry 1020D | | Mapping 1022D | | |
| ... | | ... | | |
| Entry 1020N | | Mapping 1022N | | |

INPUT

| Ingress BH Information 1102 | | |
|---|---|---|
| BH Link 1104 | RLC Channel ID 1106 | |
| Entry 1122A | | |
| Entry 1122B | | |
| Entry 1122C | | |
| Entry 1122D | | |
| ... | | |
| Entry 1122N | | |

| BAP Header Information 1108 | |
|---|---|
| BAP Routing ID 1110 | |
| BAP address 1112 | BAP path ID 1114 |

OUTPUT

| Egress BH Information 1116 | |
|---|---|
| BH Link 1118 | RLC channel ID 1120 |
| Mapping 1124A | |
| Mapping 1124B | |
| Mapping 1124C | |
| Mapping 1124D | |
| ... | |
| Mapping 1124N | |

| INPUT | | | | | OUTPUT | |
|---|---|---|---|---|---|---|
| Ingress BH Information 1302 | | BAP Header Information 1308 | | | Egress BH Information 1322 | |
| | | | BAP Routing ID 1310 | | | |
| BH Link 1304 | RLC Ch ID 1306 | Traffic Specifier 1316 | BAP ADD 1312 | BAP path ID 1314 | BH Link 1324 | RLC Ch ID 1326 |
| | | Traffic Type 1318 | Traffic Identifier 1320 | | | |
| Entry 1328A | | | | | Mapping 1330A | |
| Entry 1328B | | | | | Mapping 1330B | |
| Entry 1328C | | | | | Mapping 1330C | |
| Entry 1328D | | | | | Mapping 1330D | |
| ⋮ | | | | | ⋮ | |
| Entry 1328N | | | | | Mapping 1330N | |

CONFIGURATION FOR PACKET FORWARDING ON WIRELESS BACKHAUL

CROSS-REFERENCE TO RELATED APPLICATIONS

This Patent Application claims priority to U.S. Provisional Patent Application No. 62/886,544 entitled "CONFIGURATION FOR PACKET FORWARDING ON WIRELESS BACKHAUL" and filed on Aug. 14, 2019, which is assigned to the assignee hereof. The disclosures of all prior Applications are considered part of and are incorporated by reference in this Patent Application.

TECHNICAL FIELD

The present disclosure relates generally to communication systems, and more particularly, to Integrated Access and Backhaul (IAB) compatible devices coupled via backhaul links for packet forwarding.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless devices may communicate with one another via one or more wireless relays. For example, a packet transmitted from a user equipment (UE) to a base station (BS) providing the packet to a core network (CN) may be forwarded by intermediary wireless relays coupled by a backhaul link between the UE and the BS, such as defined by an Integrated Access and Backhaul (IAB) in 5G NR (such as in the 3GPP standards for 5G NR, including release 16). However, packets may also be provided from an application layer of a wireless relay for forwarding on the backhaul link to the BS. Therefore, the wireless relay needs to be configured to handle forwarding of packets from another device (such as another wireless relay) as well as packets from upper layers of the wireless relay itself.

The wireless relay (which may be referred to as an IAB-node herein), may include a Backhaul Adaption Protocol (BAP) layer above the Radio Link Control (RLC) layer and below the Packet Data Convergence Protocol (PDCP) layer. The BAP layer may be configured to use a first configuration when a packet is retrieved from the RLC layer (indicating the packet is received from another device) in order for the IAB-node to forward the packet to another device (such as another IAB-node or the BS supporting IAB, which may be referred to as an IAB-donor herein). The BAP layer may also be configured to use a second configuration when a packet is retrieved from the PDCP layer (or another upped layer) in order for the IAB-node to forward the packet to the other IAB-node or the IAB-donor. The first configuration may include mappings between ingress backhaul links and logical channels of the backhaul link for receiving the packet and egress backhaul links and logical channels of the backhaul link for forwarding the packet. The second configuration may include mappings between traffic types and identifiers of the received packet and egress backhaul links and logical channels of the backhaul link for forwarding the packet.

In some aspects of the disclosure, a method, an apparatus, a computer-readable medium, and another apparatus for wireless communication are provided. An example method of wireless communication by a first IAB-node coupled between a UE and an IAB-donor in an IAB network includes retrieving, by a BAP layer of the first IAB-node, a first packet from an upper layer or an RLC layer of the first IAB-node. The method also includes determining an egress RLC channel of an egress backhaul (BH) link with a second device for transmitting the first packet based on a first configuration in response to retrieving the first packet from the RLC layer or a second configuration in response to retrieving the first packet from the upper layer. The method also includes transmitting the first packet to the second device via the egress RLC channel of the egress BH. The second device may be a second IAB-node or the IAB-donor.

The first configuration may include a first entry mapping BAP header information of the first packet and an ingress RLC channel of an ingress BH link with a third device via which the first IAB-node receives the first packet from the third device to the egress RLC channel. The BAP header information may include a BAP routing identifier, and the BAP routing identifier may include one or more of a BAP address of the second device or a BAP path identifier. In some implementations, determining the egress RLC channel based on the first configuration includes matching the BAP address and the BAP path identifier from the BAP header information and the ingress RLC channel of the ingress BH link in the first entry of the first configuration to determine the egress RLC channel of the egress BH link. Determining the egress RLC channel based on the first configuration may further include matching a traffic specifier from the BAP header information in the first entry of the first configuration to determine the egress RLC channel of the egress BH link.

The traffic specifier may include one or more of a traffic type or a traffic identifier. In some implementations, the traffic type indicates one of: F1 user plane (F1-U) protocol traffic between the first IAB-node and the IAB-donor; F1 control plane (F1-C) protocol traffic between the first IAB-node and the IAB-donor; non-F1 protocol traffic; Internet Protocol version 6 (IPv6) traffic; or Internet Protocol version 4 (IPv4) traffic. The F1-C protocol traffic may be UE-associated or non-UE-associated. The traffic identifier may include one of: a General Packet Radio Service (GPRS) Tunneling Protocol (GTP) for user data (GTP-U) tunneling endpoint identifier (TEID); a Stream Control Transmission Protocol (SCTP) stream identifier; a gNodeB distributed unit (gNB-DU) F1 application layer (F1-AP) protocol UE-associated identifier; a gNB-DU identifier; an IPv6 flow label value; or an Internet Protocol (IP) Differentiated Services Code Point (DSCP) value.

In some implementations, the method also includes retrieving, from the RLC layer, a second packet to be forwarded to the second device. The first packet is associated with a first user equipment bearer (UE-bearer), the second packet is associated with a second UE-bearer, the first UE-bearer and the second UE-bearer are aggregated onto the ingress RLC channel when received from the third device, and the second UE-bearer is initially mapped to the egress RLC channel with the first UE-bearer. The method may also include remapping the second UE-bearer to a second egress RLC channel. The first packet is transmitted via the egress RLC channel and the second packet is transmitted via the second egress RLC channel to the second device.

The second configuration may include an entry mapping a traffic specifier of the first packet to the egress RLC channel of the egress BH link. The traffic specifier may include one or more of a traffic type or a traffic identifier. In some implementations, determining the egress RLC channel based on the second configuration includes matching the traffic type and the traffic identifier of the first packet to the entry of the second configuration mapping to the egress RLC channel of the egress BH link. The method may also include determining a BAP routing identifier for the first packet based on the second configuration in response to retrieving the first packet from the upper layer. The entry of the second configuration further maps the traffic type and the traffic identifier of the first packet to the BAP routing identifier. The method may also include adding a BAP header including the BAP routing identifier to the first packet before transmitting the first packet to the second device. The BAP routing identifier includes one or more of a BAP address of a device to receive the packet or a BAP path identifier.

The traffic type may indicate one of: F1 user plane (F1-U) protocol traffic between the first IAB-node and the IAB-donor; non-UE associated F1 control plane (F1-C) protocol traffic between the first IAB-node and the IAB-donor; UE associated F1-C protocol traffic between the first IAB-node and the IAB-donor; or non-F1 protocol traffic. In some implementations, the traffic identifier includes, for a traffic type indicating F1-U protocol traffic, a General Packet Radio Service (GPRS) Tunneling Protocol (GTP) for user data (GTP-U) tunneling endpoint identifier (TEID). The traffic identifier may include, for a traffic type indicating non-UE associated F1-C protocol traffic, one of a Stream Control Transmission Protocol (SCTP) stream identifier or a gNodeB distributed unit (gNB-DU) identifier in the F1 application layer (F1-AP). The traffic identifier may include, for a traffic type indicating UE associated F1-C protocol traffic, one of a Stream Control Transmission Protocol (SCTP) stream identifier or a gNodeB distributed unit (gNB-DU) F1 application layer (F1-AP) protocol UE-associated identifier.

In some implementations, the method includes receiving one or more of the first configuration or the second configuration generated by the IAB-donor and storing the one or more configurations in a memory of the first IAB-node. Determining the egress RLC channel includes accessing the one or more configurations in the memory by one or more processors implementing the BAP layer.

An example IAB-node coupled between a UE and an IAB-donor may include one or more processors to implement an RLC layer and a BAP layer. The BAP layer is to retrieve a first packet from an upper layer or the RLC layer of the IAB-node and determine an egress RLC channel of an egress BH link with a second device for transmitting the first packet based on a first configuration in response to retrieving the first packet from the RLC layer or a second configuration in response to retrieving the first packet from the upper layer. The IAB-node also includes one or more transmitters to transmit the first packet to the second device via the egress RLC channel of the egress BH link with the second device. The second device is a second IAB-node or the IAB-donor.

The first configuration may include a first entry mapping BAP header information of the first packet and an ingress RLC channel of an ingress BH link with a third device via which the IAB-node receives the first packet from the third device to the egress RLC channel. The BAP header information may include a BAP routing identifier, and the BAP routing identifier may include one or more of a BAP address of the second device or a BAP path identifier. In some implementations, determining the egress RLC channel based on the first configuration includes matching the BAP address and the BAP path identifier from the BAP header information and the ingress RLC channel of the ingress BH link in the first entry of the first configuration to determine the egress RLC channel of the egress BH link. Determining the egress RLC channel based on the first configuration may further include matching a traffic specifier from the BAP header information in the first entry of the first configuration to determine the egress RLC channel of the egress BH link.

The traffic specifier may include one or more of a traffic type or a traffic identifier. In some implementations, the traffic type indicates one of: F1 user plane (F1-U) protocol traffic between the IAB-node and the IAB-donor; F1 control plane (F1-C) protocol traffic between the IAB-node and the IAB-donor; non-F1 protocol traffic; Internet Protocol version 6 (IPv6) traffic; or Internet Protocol version 4 (IPv4) traffic. The F1-C protocol traffic may be UE-associated or non-UE-associated. The traffic identifier may include one of: a General Packet Radio Service (GPRS) Tunneling Protocol (GTP) for user data (GTP-U) tunneling endpoint identifier (TEID); a Stream Control Transmission Protocol (SCTP) stream identifier; a gNodeB distributed unit (gNB-DU) F1 application layer (F1-AP) protocol UE-associated identifier; a gNB-DU identifier; an IPv6 flow label value; or an Internet Protocol (IP) Differentiated Services Code Point (DSCP) value.

In some implementations, the BAP layer implemented by the one or more processors is to retrieve, from the RLC layer, a second packet to be forwarded to the second device.

The first packet is associated with a first user equipment bearer (UE-bearer), the second packet is associated with a second UE-bearer, the first UE-bearer and the second UE-bearer are aggregated onto the ingress RLC channel when received from the third device, and the second UE-bearer is initially mapped to the egress RLC channel with the first UE-bearer. The BAP layer is to remap the second UE-bearer to a second egress RLC channel. The first packet is transmitted via the egress RLC channel and the second packet is transmitted via the second egress RLC channel to the second device.

The second configuration may include an entry mapping a traffic specifier of the first packet to the egress RLC channel of the egress BH link. The traffic specifier may include one or more of a traffic type or a traffic identifier. In some implementations, determining the egress RLC channel based on the second configuration includes matching the traffic type and the traffic identifier of the first packet to the entry of the second configuration mapping to the egress RLC channel of the egress BH link. The method may also include determining a BAP routing identifier for the first packet based on the second configuration in response to retrieving the first packet from the upper layer. The entry of the second configuration further maps the traffic type and the traffic identifier of the first packet to the BAP routing identifier. The method may also include adding a BAP header including the BAP routing identifier to the first packet before transmitting the first packet to the second device. The BAP routing identifier includes one or more of a BAP address of a device to receive the packet or a BAP path identifier.

The traffic type may indicate one of: F1 user plane (F1-U) protocol traffic between the IAB-node and the IAB-donor; non-UE associated F1 control plane (F1-C) protocol traffic between the IAB-node and the IAB-donor; UE associated F1-C protocol traffic between the IAB-node and the IAB-donor; or non-F1 protocol traffic. In some implementations, the traffic identifier includes, for a traffic type indicating F1-U protocol traffic, a General Packet Radio Service (GPRS) Tunneling Protocol (GTP) for user data (GTP-U) tunneling endpoint identifier (TEID). The traffic identifier may include, for a traffic type indicating non-UE associated F1-C protocol traffic, one of a Stream Control Transmission Protocol (SCTP) stream identifier or a gNodeB distributed unit (gNB-DU) identifier in the F1 application layer (F1-AP). The traffic identifier may include, for a traffic type indicating UE associated F1-C protocol traffic, one of a Stream Control Transmission Protocol (SCTP) stream identifier or a gNodeB distributed unit (gNB-DU) F1 application layer (F1-AP) protocol UE-associated identifier.

In some implementations, the IAB-donor includes one or more receivers to receive one or more of the first configuration or the second configuration generated by the IAB-donor. The IAB-donor may also include a memory to store the one or more configurations. Determining the egress RLC channel includes accessing the one or more configurations in the memory by one or more processors implementing the BAP layer.

An example non-transitory computer readable medium stores instructions that, when executed by one or more processors of an IAB-node, causes the IAB-node to retrieve, by a BAP layer of the IAB-node, a first packet from an upper layer or an RLC layer of the IAB-node. Execution of the instructions also causes the IAB-node to determine an egress RLC channel of an egress backhaul (BH) link with a second device for transmitting the first packet based on a first configuration in response to retrieving the first packet from the RLC layer or a second configuration in response to retrieving the first packet from the upper layer. Execution of the instructions also causes the IAB-node to transmit the first packet to the second device via the egress RLC channel of the egress BH. The second device may be a second IAB-node or the IAB-donor.

The first configuration may include a first entry mapping BAP header information of the first packet and an ingress RLC channel of an ingress BH link with a third device via which the first IAB-node receives the first packet from the third device to the egress RLC channel. The BAP header information may include a BAP routing identifier, and the BAP routing identifier may include one or more of a BAP address of the second device or a BAP path identifier. In some implementations, determining the egress RLC channel based on the first configuration includes matching the BAP address and the BAP path identifier from the BAP header information and the ingress RLC channel of the ingress BH link in the first entry of the first configuration to determine the egress RLC channel of the egress BH link. Determining the egress RLC channel based on the first configuration may further include matching a traffic specifier from the BAP header information in the first entry of the first configuration to determine the egress RLC channel of the egress BH link.

The traffic specifier may include one or more of a traffic type or a traffic identifier. In some implementations, the traffic type indicates one of: F1 user plane (F1-U) protocol traffic between the IAB-node and the IAB-donor; F1 control plane (F1-C) protocol traffic between the IAB-node and the IAB-donor; non-F1 protocol traffic; Internet Protocol version 6 (IPv6) traffic; or Internet Protocol version 4 (IPv4) traffic. The F1-C protocol traffic may be UE-associated or non-UE-associated. The traffic identifier may include one of: a General Packet Radio Service (GPRS) Tunneling Protocol (GTP) for user data (GTP-U) tunneling endpoint identifier (TEID); a Stream Control Transmission Protocol (SCTP) stream identifier; a gNodeB distributed unit (gNB-DU) F1 application layer (F1-AP) protocol UE-associated identifier; a gNB-DU identifier; an IPv6 flow label value; or an Internet Protocol (IP) Differentiated Services Code Point (DSCP) value.

In some implementations, execution of the instructions also causes the IAB-node to retrieve, from the RLC layer, a second packet to be forwarded to the second device. The first packet is associated with a first user equipment bearer (UE-bearer), the second packet is associated with a second UE-bearer, the first UE-bearer and the second UE-bearer are aggregated onto the ingress RLC channel when received from the third device, and the second UE-bearer is initially mapped to the egress RLC channel with the first UE-bearer. Execution of the instructions may also cause the IAB-node to remap the second UE-bearer to a second egress RLC channel. The first packet is transmitted via the egress RLC channel and the second packet is transmitted via the second egress RLC channel to the second device.

The second configuration may include an entry mapping a traffic specifier of the first packet to the egress RLC channel of the egress BH link. The traffic specifier may include one or more of a traffic type or a traffic identifier. In some implementations, determining the egress RLC channel based on the second configuration includes matching the traffic type and the traffic identifier of the first packet to the entry of the second configuration mapping to the egress RLC channel of the egress BH link. Execution of the instructions may also cause the IAB-node to determine a BAP routing identifier for the first packet based on the second configuration in response to retrieving the first packet from the upper layer. The entry of the second configuration further maps the traffic type and the traffic identifier of the first packet to the BAP routing identifier. Execution of the instructions may also cause the IAB-node to include adding a BAP header including the BAP routing identifier to the first packet before transmitting the first packet to the second device. The BAP routing identifier includes one or more of a BAP address of a device to receive the packet or a BAP path identifier.

The traffic type may indicate one of: F1 user plane (F1-U) protocol traffic between the first IAB-node and the IAB-donor; non-UE associated F1 control plane (F1-C) protocol traffic between the first IAB-node and the IAB-donor; UE associated F1-C protocol traffic between the first IAB-node and the IAB-donor; or non-F1 protocol traffic. In some implementations, the traffic identifier includes, for a traffic type indicating F1-U protocol traffic, a General Packet Radio Service (GPRS) Tunneling Protocol (GTP) for user data (GTP-U) tunneling endpoint identifier (TEID). The traffic identifier may include, for a traffic type indicating non-UE associated F1-C protocol traffic, one of a Stream Control Transmission Protocol (SCTP) stream identifier or a gNodeB distributed unit (gNB-DU) identifier in the F1 application layer (F1-AP). The traffic identifier may include, for a traffic type indicating UE associated F1-C protocol traffic, one of a Stream Control Transmission Protocol (SCTP) stream identifier or a gNodeB distributed unit (gNB-DU) F1 application layer (F1-AP) protocol UE-associated identifier.

In some implementations, execution of the instructions also causes the IAB-node to receive one or more of the first configuration or the second configuration generated by the IAB-donor and store the one or more configurations in a memory of the first IAB-node. Determining the egress RLC channel includes accessing the one or more configurations in the memory by one or more processors implementing the BAP layer.

Another example IAB-node includes means for retrieving a first packet from an upper layer to a BAP layer of the IAB-node or from an RLC layer of the IAB-node. The IAB-node also includes means for determining an egress RLC channel of an egress backhaul (BH) link with a second device for transmitting the first packet based on a first configuration in response to retrieving the first packet from the RLC layer or a second configuration in response to retrieving the first packet from the upper layer. The IAB-node also includes means for transmitting the first packet to the second device via the egress RLC channel of the egress BH. The second device may be a second IAB-node or the IAB-donor.

The first configuration may include a first entry mapping BAP header information of the first packet and an ingress RLC channel of an ingress BH link with a third device via which the first IAB-node receives the first packet from the third device to the egress RLC channel. The BAP header information may include a BAP routing identifier, and the BAP routing identifier may include one or more of a BAP address of the second device or a BAP path identifier. In some implementations, determining the egress RLC channel based on the first configuration includes matching the BAP address and the BAP path identifier from the BAP header information and the ingress RLC channel of the ingress BH link in the first entry of the first configuration to determine the egress RLC channel of the egress BH link. Determining the egress RLC channel based on the first configuration may further include matching a traffic specifier from the BAP header information in the first entry of the first configuration to determine the egress RLC channel of the egress BH link.

The traffic specifier may include one or more of a traffic type or a traffic identifier. In some implementations, the traffic type indicates one of: F1 user plane (F1-U) protocol traffic between the IAB-node and the IAB-donor; F1 control plane (F1-C) protocol traffic between the IAB-node and the IAB-donor; non-F1 protocol traffic; Internet Protocol version 6 (IPv6) traffic; or Internet Protocol version 4 (IPv4) traffic. The F1-C protocol traffic may be UE-associated or non-UE-associated. The traffic identifier may include one of: a General Packet Radio Service (GPRS) Tunneling Protocol (GTP) for user data (GTP-U) tunneling endpoint identifier (TEID); a Stream Control Transmission Protocol (SCTP) stream identifier; a gNodeB distributed unit (gNB-DU) F1 application layer (F1-AP) protocol UE-associated identifier; a gNB-DU identifier; an IPv6 flow label value; or an Internet Protocol (IP) Differentiated Services Code Point (DSCP) value.

In some implementations, the IAB-node includes means for retrieving, from the RLC layer, a second packet to be forwarded to the second device. The first packet is associated with a first user equipment bearer (UE-bearer), the second packet is associated with a second UE-bearer, the first UE-bearer and the second UE-bearer are aggregated onto the ingress RLC channel when received from the third device, and the second UE-bearer is initially mapped to the egress RLC channel with the first UE-bearer. The IAB-node may also include means for remapping the second UE-bearer to a second egress RLC channel. The first packet is transmitted via the egress RLC channel and the second packet is transmitted via the second egress RLC channel to the second device.

The second configuration may include an entry mapping a traffic specifier of the first packet to the egress RLC channel of the egress BH link. The traffic specifier may include one or more of a traffic type or a traffic identifier. In some implementations, determining the egress RLC channel based on the second configuration includes matching the traffic type and the traffic identifier of the first packet to the entry of the second configuration mapping to the egress RLC channel of the egress BH link. The IAB-node may also include means for determining a BAP routing identifier for the first packet based on the second configuration in response to retrieving the first packet from the upper layer. The entry of the second configuration further maps the traffic type and the traffic identifier of the first packet to the BAP routing identifier. The IAB-node may also include means for adding a BAP header including the BAP routing identifier to the first packet before transmitting the first packet to the second device. The BAP routing identifier includes one or more of a BAP address of a device to receive the packet or a BAP path identifier.

The traffic type may indicate one of: F1 user plane (F1-U) protocol traffic between the first IAB-node and the IAB-donor; non-UE associated F1 control plane (F1-C) protocol traffic between the first IAB-node and the IAB-donor; UE associated F1-C protocol traffic between the first IAB-node and the IAB-donor; or non-F1 protocol traffic. In some implementations, the traffic identifier includes, for a traffic type indicating F1-U protocol traffic, a General Packet Radio Service (GPRS) Tunneling Protocol (GTP) for user data (GTP-U) tunneling endpoint identifier (TEID). The traffic identifier may include, for a traffic type indicating non-UE associated F1-C protocol traffic, one of a Stream Control Transmission Protocol (SCTP) stream identifier or a gNodeB distributed unit (gNB-DU) identifier in the F1 application layer (F1-AP). The traffic identifier may include, for a traffic type indicating UE associated F1-C protocol traffic, one of a Stream Control Transmission Protocol (SCTP) stream identifier or a gNodeB distributed unit (gNB-DU) F1 application layer (F1-AP) protocol UE-associated identifier.

In some implementations, the AB-node includes means for receiving one or more of the first configuration or the second configuration generated by the IAB-donor and means for storing the one or more configurations. Determining the egress RLC channel includes accessing the one or more configurations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 10 is a depiction of an example second configuration mapping a traffic specifier to egress backhaul information.

FIG. 11 is a depiction of an example first configuration mapping ingress backhaul information and BAP header information to egress backhaul information.

FIG. 13 is a depiction of an example first configuration that maps ingress backhaul information and BAP header information to egress backhaul information.

DETAILED DESCRIPTION

Figure 1:
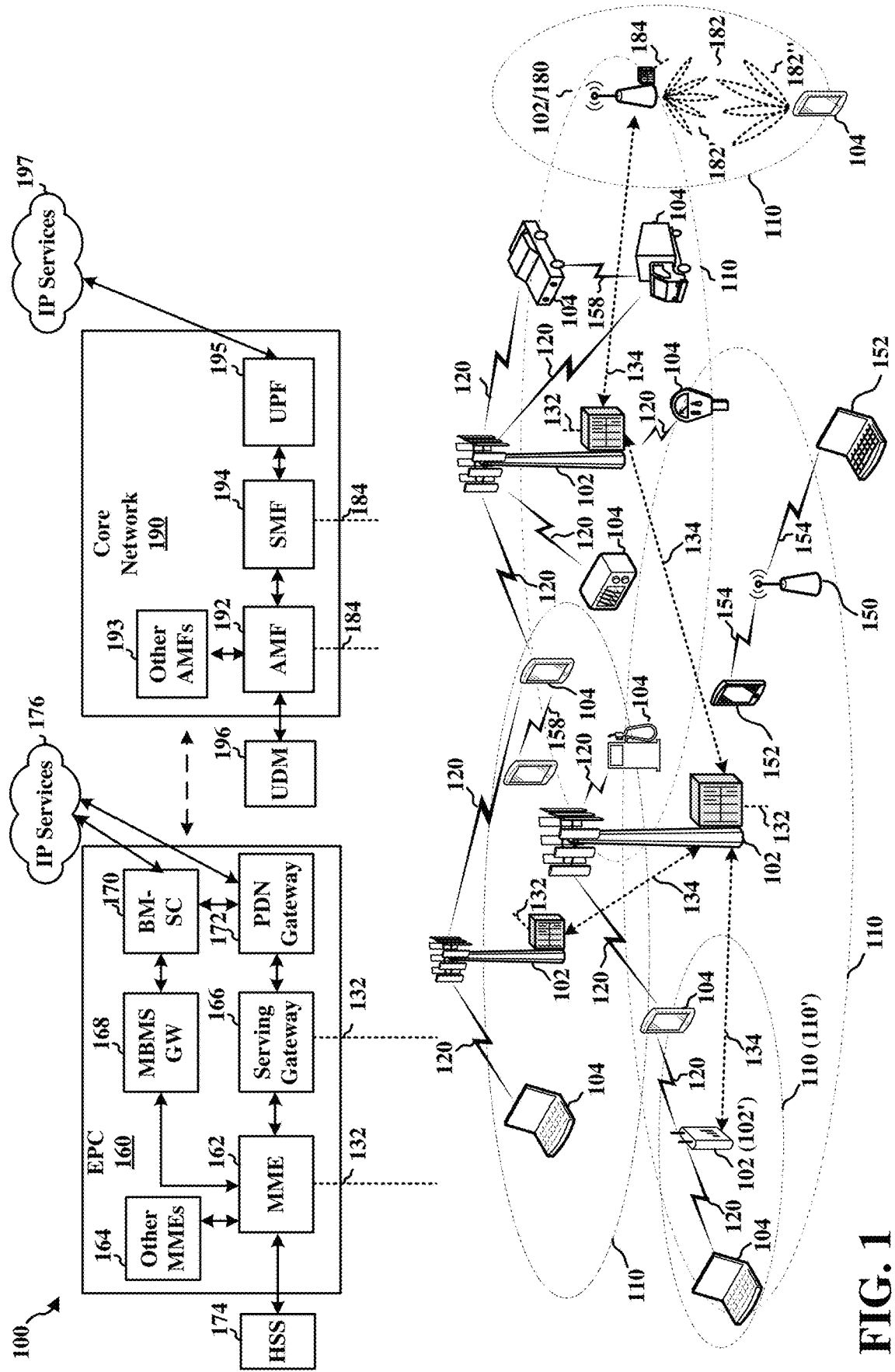
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless. In some implementations, the backhaul links 134 may be wireless backhaul links that are IAB compatible, as defined in 5G NR.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a g Node B, gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A and 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
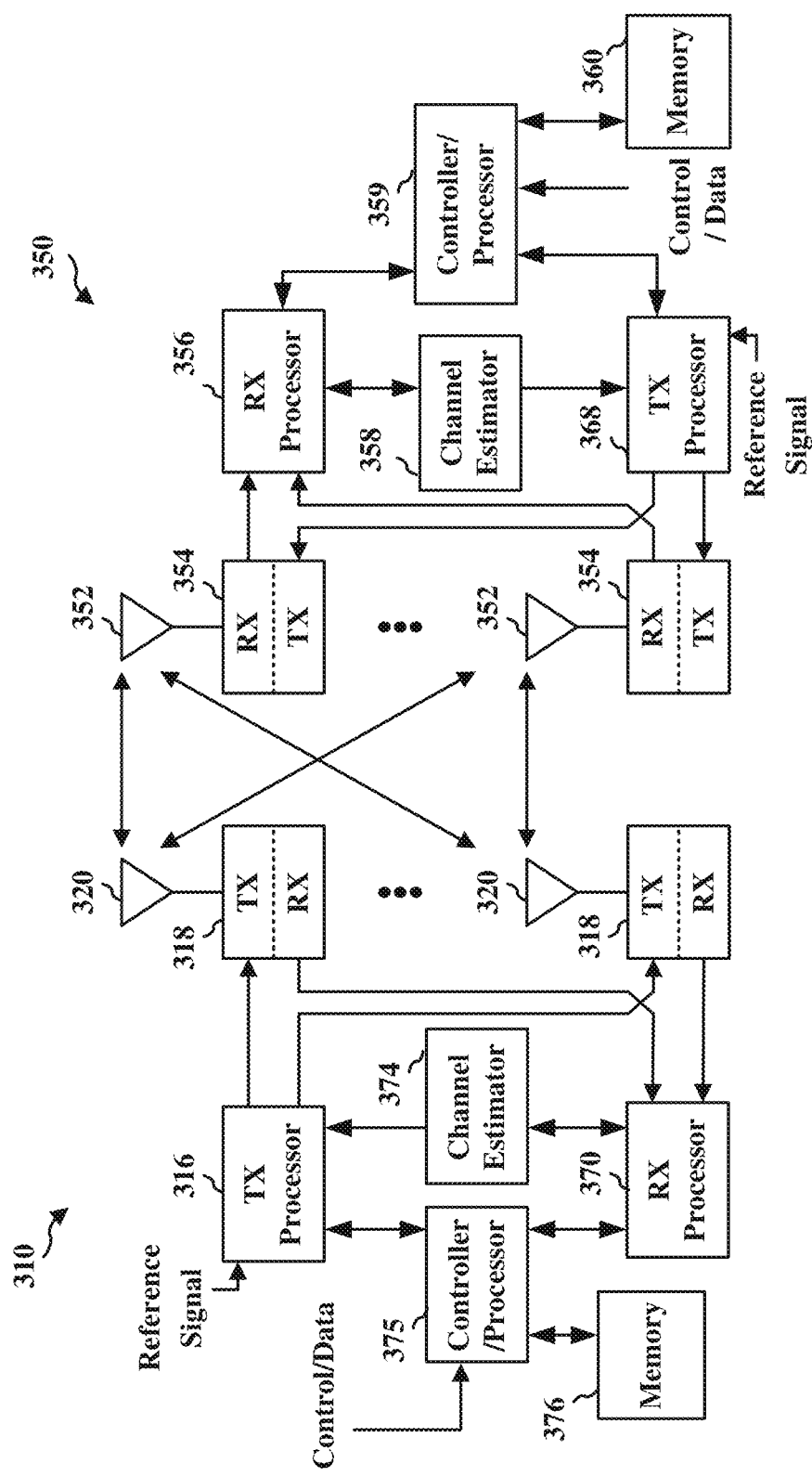
FIG. 3 is a diagram illustrating an example of a base station and user equipment (UE) in an access network.

FIG. 3 is a block diagram of a base station (BS) 310 (also referred to as a gNodeB or gNB) in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the BS 310. These soft decisions may be based on channel estimates computed by the channel estimator 358. The soft decisions are then decoded and deinterleaved to recover the data and control signals that were originally transmitted by the BS 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the BS 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the BS 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the BS 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

While not shown, a packet from the UE 350 to the BS 310 may be communicated via one or more wireless relays between the BS 310 and the UE 350. For example, referring back to FIG. 1, multiple base stations 102 may be coupled to one another via IAB-compatible wireless backhaul (BH) links 134. A wireless packet from a UE 104 may reach a BS 102 for introduction into the control network (CN) 190 by being relayed by one or more intermediate BS 102 via the IAB-compatible BH links 134. An IAB-compatible BS 102 relaying the packet may be referred to as an IAB-node. The BS 102 to receive the packet for the CN 190 may be referred to as an IAB-donor.

In configuring a device (such as a BS 102) for IAB compatibility, the device may include another level 2 layer of functionality between the PDCP layer and the RLC layer. Referring back to FIG. 3, the controller/processor 375 of the BS 310 may be configured to implement functionality of a Backhaul Adaptation Protocol (BAP) layer between the PDCP layer and the RLC layer, as defined by 5G NR. The functionality of the BAP layer may include:
retrieving received packets from the RLC layer;
retrieving packets from an upper layer (such as the PDCP layer);
differentiating between traffic to be delivered to an upper layer and traffic to be delivered to the RLC layer for egress;
delivering packets to the RLC layer for egress;
delivering packets to the upper layer; and
selecting BAP routing identifiers for packets received from the upper layer and to be provided to the RLC layer for egress.

In some implementations, the BAP layer functionality may also include bearer mapping/remapping and routing for packets delivered to the RLC layer for egress.

Figure 4:
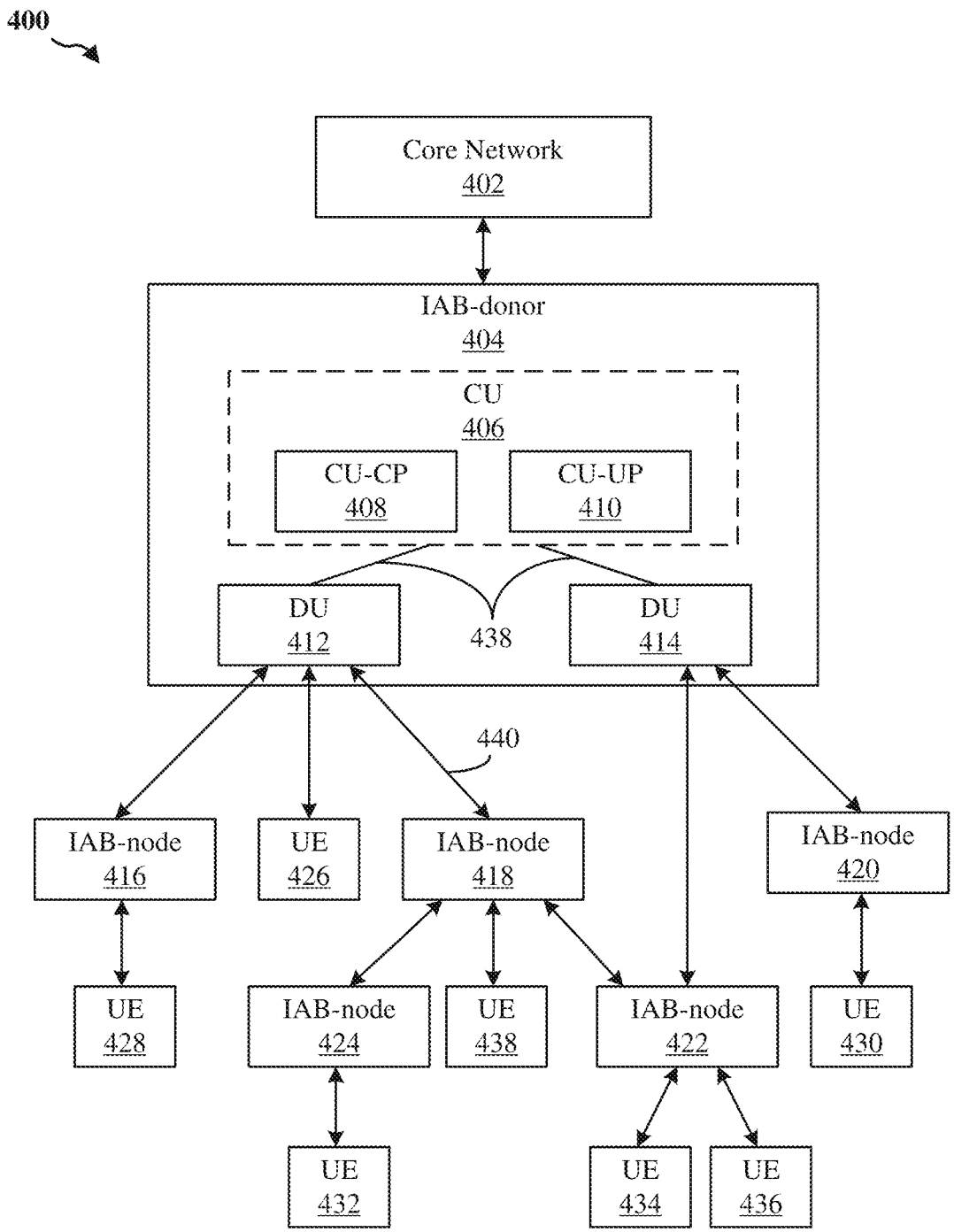
FIG. 4 is a block diagram of an example IAB topology.

FIG. 4 is a block diagram of an example IAB topology 400. The topology 400 includes an IAB-donor 404 coupled to the CN 402. The topology 400 further includes IAB-nodes 416-424 and UEs 426-438 coupled directly or indirectly (such as via one or more IAB-nodes) to the IAB-donor 404. For example, the IAB-node 424 and the UE 432 are coupled to the IAB-donor 404 via the IAB-node 418. The links between the IAB-donor 404, the IAB-nodes 416-424, and the UEs 426-438 may be wireless, IAB-compatible BH links. For example, the BH link 440 may be a wireless, IAB-compatible BH link as defined in the RLC layer of the IAB-node 418 and the IAB-donor 404 (such as a defined one or more RLC channels (also referred to as logical channels) on the wireless BH link).

The IAB-donor 404 may include a gNB central unit (CU) 406, which may include a control plane central unit (CU-CP) 408 for IAB management tasks, such as topology, route, and resource management. The CU 406 may also include a user plane central unit (CU-UP) 410. The IAB-donor 404 may also include one or more distributed units 412 and 414 for interfacing with IAB-nodes and/or UEs. Each DU 412 and 414 may be coupled to the CU 406 via a wireline internet protocol (IP) link 438.

An upstream IAB-node from another IAB-node toward the IAB-donor may be referred to as a parent IAB-node. Additionally, a downstream IAB-node from another IAB-node toward a UE may be referred to as a child UAB-node. For example, the IAB-node 424 is a child IAB-node to the IAB-node 418, and the IAB-node 418 is a parent IAB-node to the IAB-node 424. The IAB topology 400 may be a directed acyclic graph (DAG) topology for the IAB donor 404. Furthermore, the topology 400 may be configured such that: each DU of the IAB-donor may support multiple IAB-nodes; each IAB-node may support multiple child IAB-nodes; and each IAB-node may have up to two parent IAB-nodes. As shown in the IAB topology 400, the BAP layer may support multi-hop routing (such as to and from UE 432 and IAB-donor 404 via IAB-node 424 and IAB-node 418).

As noted above, the IAB-donor 404 may be a gNB configured for IAB protocol communications. The IAB-nodes 416-422 may also be gNBs. For example, each IAB-node 416-424 may include a gNB-DU (DU) and a mobile termination (MT) component for coupling to one or more IAB nodes as well as to one or more UEs.

Figure 5:
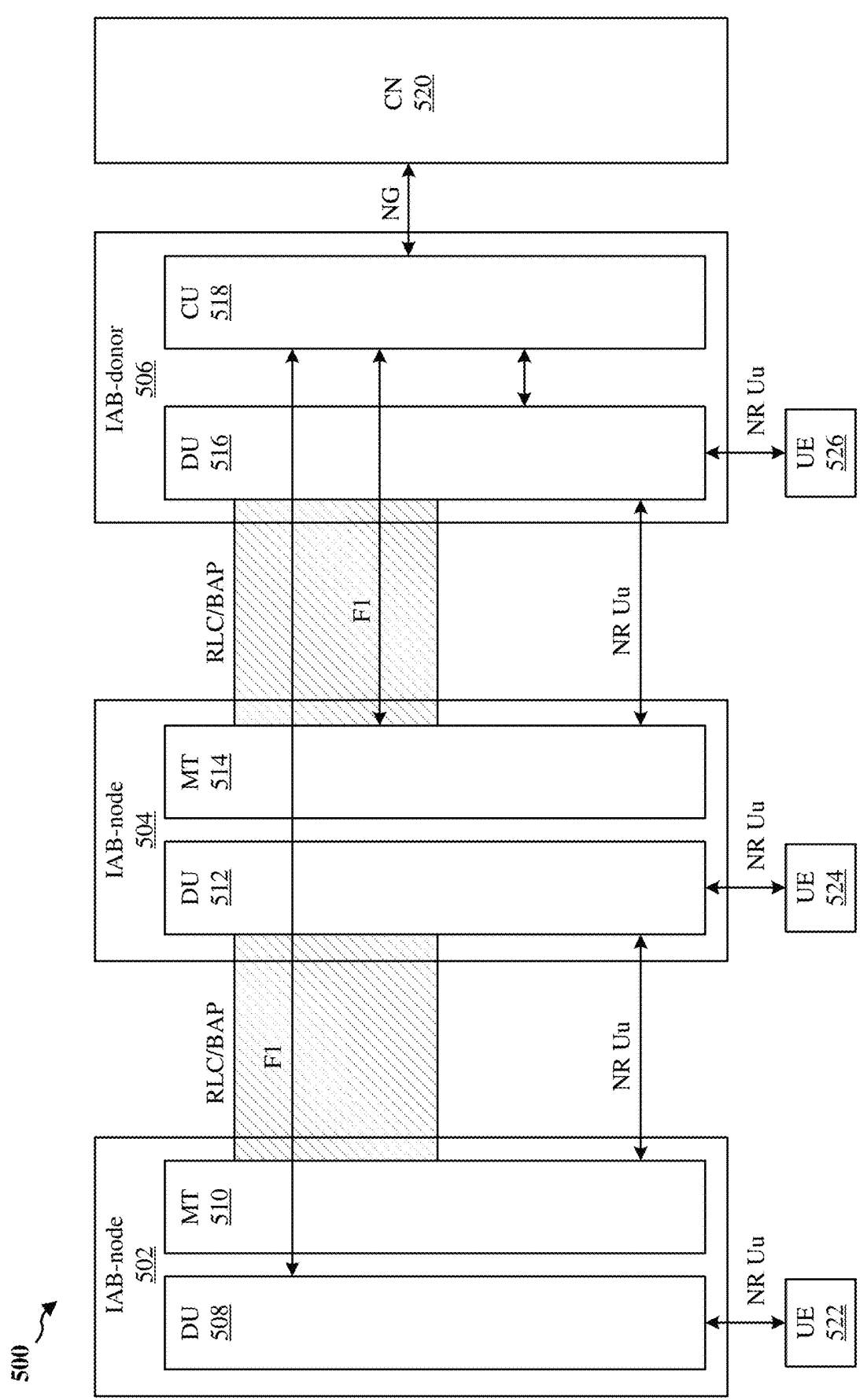
FIG. 5 is a block diagram of an example IAB architecture.

FIG. 5 is a block diagram of an example IAB architecture 500. The example IAB architecture 500 includes two IAB-nodes 502 and 504 and an IAB-donor 506. The architecture 500 may be an example implementation of IAB-nodes 418 and 424 and IAB-donor 404 in FIG. 4. The IAB-node 502 may be a child IAB-node of IAB-node 504. As shown, the IAB-node 502 includes a DU 508 component and an MT 510 component, the IAB-node 504 includes a DU 512 component and an MT 514 component, and the IAB-donor 506 includes a DU 516 component and a CU 518 component. While not shown, the IAB-donor CU 518 may be logically separated into the CU for the user plane (CU-UP) and the CU for the control plane (CU-CP), such as illustrated in the IAB topology 400 in FIG. 4.

The IAB-node 502 may be configured such that the DU 508 may communicate with one or more UEs (such as UE 522) via NR Uu radio interface telecommunications as defined in 5G NR. Furthermore, the IAB-node 504 may be configured such that the DU 512 may communicate with one or more UEs (such as UE 524) via NR Uu radio interface telecommunications, and the IAB-donor 506 may be configured such that the DU 516 may communicate with one or more UEs (such as UE 526) via NR Uu radio interface telecommunications. Also as shown, the MT 510 of the child IAB-node 502 may communicate with the DU 512 of the parent IAB-node 504 via backhaul NR Uu radio interface telecommunications, and the MT 514 of the IAB-node 504 may communicate with the DU 516 of the IAB-donor 506 via backhaul NR Uu radio interface telecommunications.

The IAB-node 502 and the IAB-node 504 may also be communicably coupled between the MT 510 and the DU 512 via an IAB-compatible BH as defined in the RLC and BAP layers of the IAB-nodes 502 and 504, and the IAB-node 504 and the IAB-donor 506 may be communicably coupled between the MT 514 and the DU 516 via an IAB-compatible BH as defined in the RLC and BAP layers of the IAB-node 504 and the IAB-donor 506. For example, the transport over the BHs between the IAB-nodes 502 and 504 and the IAB-donor 506 may include sending information via BAP packets over one or more RLC channels between devices.

In this manner, the DU 508 of the IAB-node 502 may communicate with the CU 518 of the IAB-donor 506 using F1 protocol communications (such as defined in 3GPP technical specification (TS) 38.401) via the BHs among the IAB-nodes 502 and 504 and the IAB-donor 506. For example, a packet from the IAB-node 502 for the CN 520 may be transmitted to IAB-node 504 via a first IAB-compatible BH link, and the IAB-node 504 may forward the packet to the IAB-donor 506 via a second IAB-compatible BH link. The IAB-donor 506 may then provide the information in the packet to the CN 520 via next generation (NG) communications. The CN 520 may also be referred to as an NG core network (NGC). While not shown, the MT 510 and the MT 514 may also be communicably coupled to the CU 518 using NR Uu backhaul communications.

As noted above, the IAB-donor CU 518 may be logically separated into the CU-UP and the CU-CP. As such, IAB protocol communications may be logically separated into IAB UP protocol communications (corresponding to the IAB UP protocol stack) and IAB CP protocol communications (corresponding to the IAB CP protocol stack).

Figure 6:
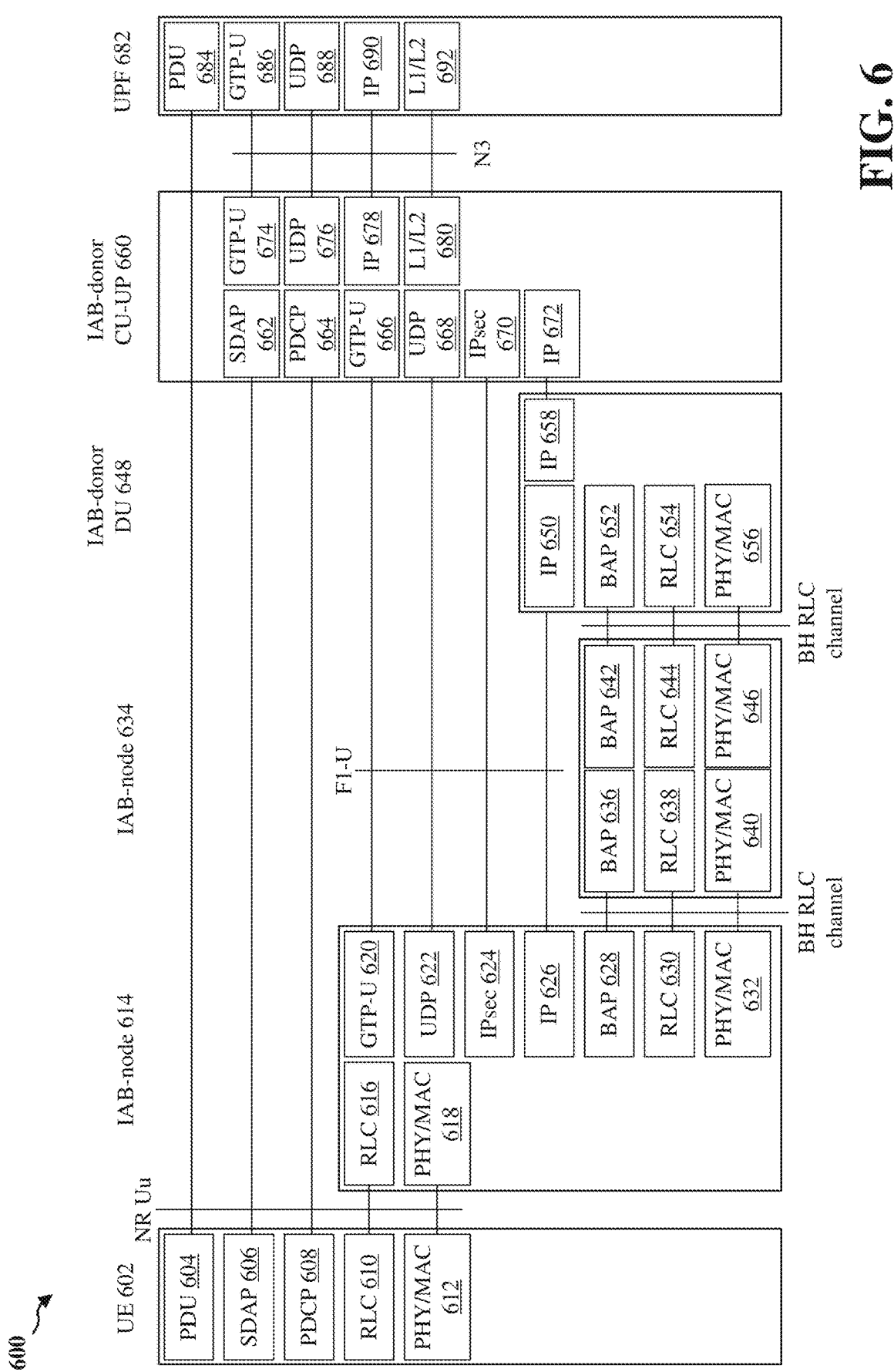
FIG. 6 is a block diagram of an example IAB user plane protocol stack.

FIG. 6 is a block diagram of an example IAB UP protocol stack 600. The example IAB UP protocol stack 600 may correspond to the example IAB architecture 500 in FIG. 5. For example, the UE 602, the IAB-node 614, the IAB-node 634, the IAB-donor DU 648, and the IAB-donor CU-UP 660 may correspond to the UE 522, the IAB-node 502, the IAB-node 504, the IAB-donor DU 516, and the IAB-donor CU 518, respectively. The order of the layers is as illustrated in the example protocol stack 600 (i.e., which layers are above or below other layers in the network model).

The UE 602 includes (from top to bottom) a PDU layer 604, an SDAP layer 606, a PDCP layer 608, an RLC layer 610, and PHY/MAC layers 612. As shown, the layers 604-612 may be logically coupled to corresponding layers of other devices. For example, the RLC layer 610 of the UE 602 may be logically coupled to the RLC layer 616 of the IAB-node 614, for which RLC layers 610 and 616 for the UE 602 and the IAB-node 614 indicate RLC channels for NR Uu communications between the UE 602 and the IAB-node 614. The PDU layer 604 may be coupled to the PDU layer 684 of the UPF 682, the SDAP layer 606 of the UE 602 may be coupled to the SDAP layer 662 of the IAB-donor CU-UP 660, and the PDCP layer 608 of the UE 602 may be coupled to the PDCP layer 664 of the IAB-donor CU-UP 660.

While corresponding layers may be logically coupled between, e.g., the UE 602 and the IAB-donor, information may be physically relayed by the intermediary IAB-nodes 614 and 634 to the IAB-donor. In this manner, the PHY layer 612 of the UE 602 may be communicably coupled to the PHY layer 618 of the IAB-node 614, which begins the relay of information from the UE 602 to the UPF 682.

The IAB-node 614 (which is coupled to the UE 602) includes an RLC layer 616 logically coupled to the RLC layer 610 of the UE 602 and PHY/MAC layers 618 communicably coupled to the PHY/MAC layers 612 of the UE 602. The IAB-node 614 may also include a General Packet Radio Service (GPRS) Tunneling Protocol (GTP) for user data (GTP-U) layer 620 logically coupled to a GTP-U layer 666, a user datagram protocol (UDP) layer 622 logically coupled to a UDP layer 668, and an internet protocol security (IPsec) layer 624 logically coupled to an IPsec layer 670 of the IAB-donor CU-UP 660. The IAB-node 614 also includes an internet protocol (IP) layer 626 logically coupled to the IP layer 650 of the IAB-donor DU 648. The couplings of the corresponding GTP-U layers, UDP layers, IPsec layers and IP layers may be included in an F1 protocol for user plane data (F1-U) interface, for which the F1 protocol may be carried by the corresponding BAP layers.

The IAB-node 614 may include a BAP layer 628 logically coupled to the BAP layer 636 and an RLC layer 630 logically coupled to the RLC layer 638 of the parent IAB-node 634. The PHY/MAC layers 632 may be communicably coupled to the PHY/MAC layers 640 of the IAB-node 634. A BH RLC channel, as indicated by the RLC layers 630 and 638, may indicate an IAB-compatible BH link (as configured by the BAP layers 628 and 636) between the IAB-node 614 and the IAB-node 634.

The IAB-node 634 may also include a BAP layer 642 logically coupled to a corresponding BAP layer 652 and an RLC layer 644 coupled to a corresponding RLC layer 654 of the IAB-donor DU 648. The PHY/MAC layers 646 may be communicably coupled to the PHY/MAC layers 656 of the IAB-donor DU 648. Similar to a BH RLC channel between the IAB-node 634 and the IAB-node 614, a BH RLC channel, as indicated by the RLC layers 644 and 654, may indicate an IAB-compatible BH link (as configured by the BAP layers 642 and 652) between the IAB-node 634 and the IAB-donor DU 648. The IAB-donor DU 648 may further include an IP layer 658 logically coupled to the corresponding IP layer 672 of the IAB-donor CU-UP 660.

As shown, the IAB-donor and the UPF 682 may be coupled via an N3 interface, which includes a GTP-U layer 674 logically coupled to a corresponding GTP-U layer 686, a UDP layer 676 logically coupled to a corresponding UDP layer 688, an IP layer 678 logically coupled to a corresponding IP layer 690, and other L1 and L2 layers 680 coupled to corresponding L1 and L2 layers 692 of the UPF 682. While not shown, the UPF 682 may be coupled to a UPF of the CN via an N9 interface.

Referring back to FIG. 3, the UE 350 may be an example configuration of the UE 602 in FIG. 6, and the BS 310 may be an example configuration of the IAB-node 614, the IAB-node 634, and the IAB-donor in FIG. 6. As noted above, the controller/processor 375 of the BS 310 may implement layer 3 and layer 2 functionality. Referring back to FIG. 6, the MAC layer 618 and RLC layer 616 are layer 2 functionalities of the IAB-node 614. Similarly, the MAC layer 632 and above (up to including the GTP-U layer 620) of the IAB-node 614, the MAC layer 640 and above and the MAC layer 646 and above of the IAB-node 634, the MAC layer 656 and above and the IP layer 658 of the IAB-donor DU 648, and the illustrated layers 662-680 of the IAB-donor CU-UP 660 may be layer 2 functionalities.

The block diagram in FIG. 6 is to illustrate the layers for communication between the UE 602 and the IAB-donor via the IAB-node 614 and the IAB-node 634. However, other layers or components that are not illustrated may be included for one or more devices. For example, the IAB-node 634 may be coupled to one or more UEs and also include a logical link to the IAB-donor CU-UP 660 (similar to the F1-U interface between the IAB-node 614 and the IAB-donor as illustrated in FIG. 6). In another example, the IAB-donor DU 648 may also be coupled directly to one or more UEs. The PHY layers 612, 618, 632, 640, 646, and 656 include layer 1 functionality. The TX processor 316 and the RX processor 370 of the BS 310 (and the TX processor 368 and the RX processor 356 of the UE 350) in FIG. 3 may implement the PHY layer (layer 1) functionality.

As noted above, UP data between the UE 602 and the IAB-donor DU 648 may be routed through the IAB-nodes 614 and 634. The BH RLC channel may be referred to as an ingress or an egress based on the flow of the packet. For example, for a packet received from the IAB-node 614 by the IAB-node 634, the BH link and the RLC channel for receiving the packet may be referred to as an ingress BH link and an ingress RLC channel, respectively, of the IAB-node 634. Similarly, if the packet is forwarded upstream by the IAB-node 634 to the IAB-donor DU 648, the BH link and the RLC channel for forwarding the packet may be referred to as an egress BH link and an egress RLC channel, respectively.

The RLC layer for the BH RLC channel may carry the BAP layer. For example, the BAP layer of a first device may be responsible for routing and RLC channel assignments of packets to be routed to a second device. In this manner, the BAP layer may be responsible for determining the ingress BH link and RLC channel of incoming packets and for determining the egress BH link and RLC channel of forwarded packets. IAB-compatible packets routed through an BH RLC channel may have a BAP header including a routing identifier for the respective packet and be referred to as a BAP packet. The BAP layer may ensure the BAP packet for egress includes a BAP header before being provided to the RLC layer. Additionally, the BAP layer may retrieve an incoming BAP packet from the RLC layer and determine information from the BAP header to be used in determining the egress BH link and RLC channel for forwarding the BAP packet.

Referring to the IAB-donor DU 648, the DU 648 may include the IP address of the IP layer (which is routable from the IAB-donor CU via a wireless fronthaul). The F1-U interface uses the IP layer between an IAB-node DU (such as from the IAB-node 614) and the IAB-donor CU (which is routed via the IAB-donor DU 648). Also, as noted above, the BAP layer may carry the IP layer. As such, the BAP layer may include IP information may from the IP layer for providing further to the RLC layer. In some implementations, for packets provided by the IP layer 650 to the BAP layer 652 for egress, an IPv6 Flow Label is used to map the packets to BH RLC channels. In some other implementations, an IPv4 Flow Label may be used. Additionally, the F1-U interface may be security protected (as illustrated by the IPsec layer). In some examples, Network Domain Security (NDS) is implemented. Operation of the BAP layer of an IAB-node is described in further detail below in describing FIG. 8.

Figure 7:
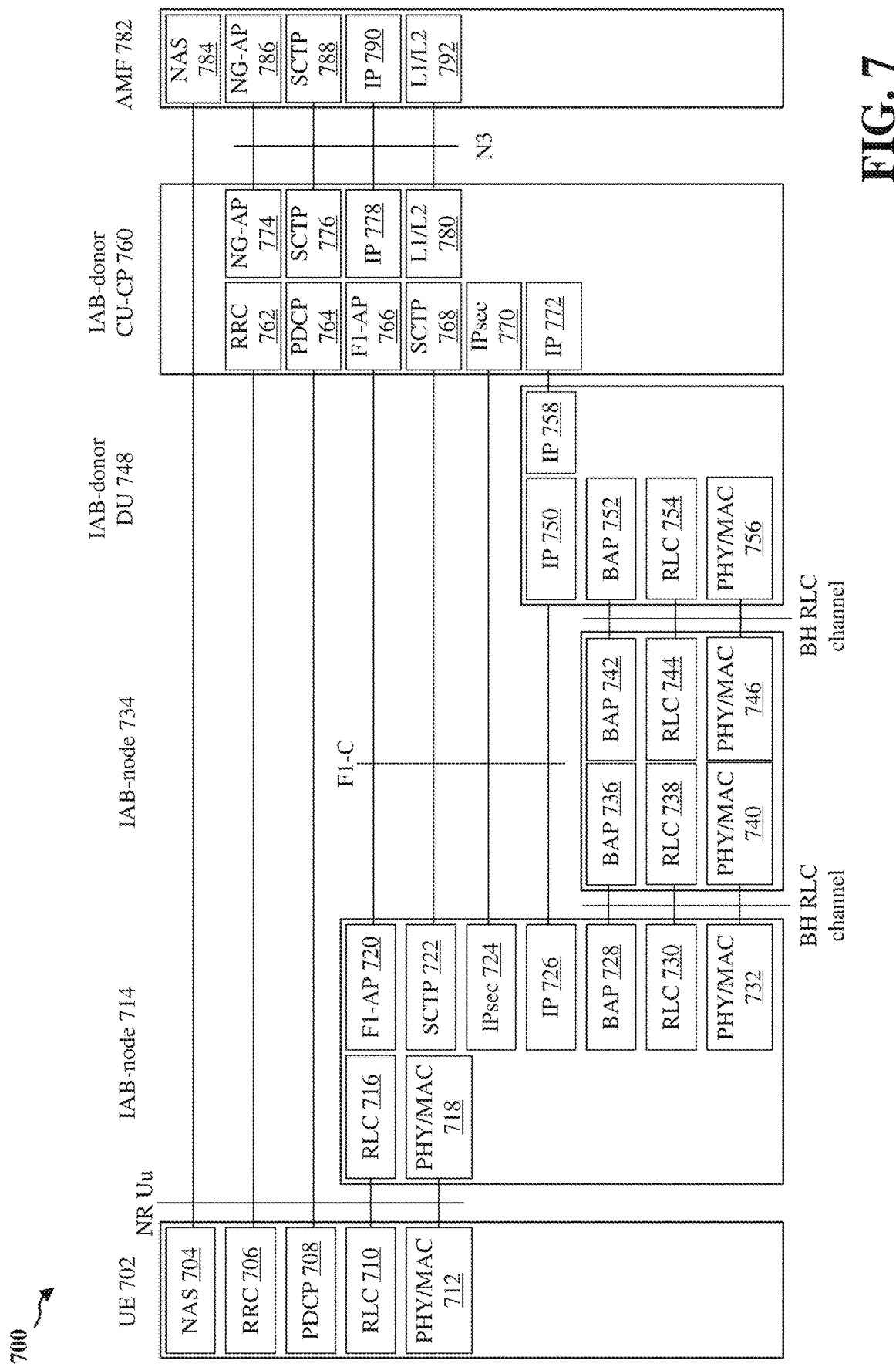
FIG. 7 is a block diagram of an example IAB control plane protocol stack.

Turning now to the CP protocol stack for communicating control information between the devices, FIG. 7 is a block diagram of an example IAB CP protocol stack 700. The CP protocol stack 700 is the CP side of the UP protocol stack 600 in FIG. 6. UE 702 is the same as UE 602, IAB-node 714 is the same as IAB-node 614, IAB-node 734 is the same as IAB-node 634, and the IAB-donor DU 748 is the same as IAB-donor DU 648. The IAB-donor CU-CP 760 is the CP corresponding to the IAB-donor CU-UP 660. Similar to the example protocol stack 600 in FIG. 6, the order of the layers is as illustrated in the example protocol stack 700.

As shown in FIG. 7, the IAB-donor is coupled to an AMF 782 via an N3 interface, which may include the next generation application layer (NG-AP) layer 774, the Stream Control Transmission Protocol (SCTP) layer 776, the IP layer 778 and other L1 and L2 layers 780 coupled to the corresponding NG-AP layer 786, SCTP layer 788, IP layer 790, and other L1 and L2 layers 792 of the AMF 782. The AMF 782 also includes a non-access stratum (NAS) layer 784 for each UE coupled to the AMF 782 (such as UE 702 including corresponding NAS layer 704) to manage establishing communication sessions and maintaining continuous communications with UEs as they move.

The UE 702 may also include an RRC layer 706 and a PDCP layer 708 logically coupled to a corresponding RRC layer 762 and PDCP layer 764 of the IAB-donor CU-CP 760. The UE 702 also includes an RLC layer 710 and PHY/MAC layers 712 coupled to a corresponding RLC layer 716 and PHY/MAC layers 718 of the IAB-node 714. As noted with respect to FIG. 6, NR Uu communications between the UE 702 and the IAB-node 714 may carry the functionalities of the layers 704-712.

The IAB-node 714 may also include an F1-AP layer 720, an SCTP layer 722, and an IPsec 724 logically coupled to a corresponding F1-AP layer 766, SCTP layer 768, and IPsec layer 770 of the IAB-donor CU-CP 760. As shown for the IAB-node 614 in FIG. 6, the IAB-node 714 also includes an IP layer 726 logically coupled to the IP layer 750 of the IAB-donor DU 748. The CP layers of the IAB-node 714 and the IAB-donor are coupled via an F1 protocol interface for the CP (F1-C).

The IAB-node 714 also includes a BAP layer 728, an RLC layer 730, and PHY/MAC layers 732 coupled to a corresponding BAP layer 736, RLC layer 738, and PHY/MAC layers 740 of the IAB-node 734 (which may communicate via one or more BH RLC channels). The IAB-node 734 also includes a BAP layer 742, an RLC layer 744, and PHY/MAC layers 746 coupled to a corresponding BAP layer 752, RLC layer 754, and PHY/MAC layers 756 of the IAB-donor DU 748 (which may communicate via one or more BH RLC channels). As also shown in FIG. 6, the IAB-donor DU 748 includes an IP layer 758 logically coupled to the corresponding IP layer 772 of the IAB-donor CU-CP 760.

As noted above, the IAB-donor DU 748 may include the IP address of the IP layer (which is routable from the IAB-donor CU via a wireless fronthaul). The F1-C interface may use the IP layer between an IAB-node DU (such as from the IAB-node 714) and the IAB-donor CU (which is routed via the IAB-donor DU 748). Also as noted for FIG. 6, for packets provided by the IP layer 750 to the BAP layer 752 for egress, an IPv6 Flow Label may be used to map the packets to BH RLC channels. In some other implementations, an IPv4 Flow Label may be used. Additionally, the F1-C interface may be security protected (as illustrated by the IPsec layer). In some examples, NDS is implemented (which may be similar to the UP security protection).

In the example CP protocol stack 700, the F1-C interface may carry the RRC layer functionalities (such as the Signal Radio Bearers (SRB)) for the UE 702 (e.g., as defined in Release 15 of the 5G NR standard from 3GPP regarding CU/DU architecture). Additionally, the F1-C interface is carried on the IP layer (and thus the BAP layer), similar to the F1-U interface for the UP being carried on the IP layer (and thus the BAP layer).

Referring back to FIG. 3, the UE 350 may be an example configuration of the UE 702 in FIG. 7, and the BS 310 may be an example configuration of the IAB-node 714, the IAB-node 734, and the IAB-donor in FIG. 7. As noted above, the controller/processor 375 of the BS 310 may implement layer 3 and layer 2 functionality. Referring back to FIG. 7, the MAC layer 718 and RLC layer 716 are layer 2 functionalities of the IAB-node 714. Similarly, the MAC layer 732 and above (up to including the F1-AP layer 720) of the IAB-node 714, the MAC layer 740 and above and the MAC layer 746 and above of the IAB-node 734, the MAC layer 756 and above and the IP layer 758 of the IAB-donor DU 748, and the illustrated layers 762-780 of the IAB-donor CU-CP 760 may be layer 2 functionalities. The PHY layers 712, 718, 732, 740, 746, and 756 include layer 1 functionality. The TX processor 316 and the RX processor 370 of the BS 310 (and the TX processor 368 and the RX processor 356 of the UE 350) in FIG. 3 may implement the PHY layer (layer 1) functionality.

As noted above, an IAB-node may be configured as a wireless relay for packets from one or more other IAB-nodes, and the IAB-node may also be configured as the gNB for wireless connection by one or more UEs of network. As a result, the IAB-node is configured to forward packets (as the wireless relay), as well as introduce packets of information from UEs wireless connected to the IAB-node, through the BH for relay to the IAB-donor. In this manner, the IAB-node, at the BAP layer, is configured to handle (i) packets from upper layers for introduction into an IAB-compatible BH link to another device (such as another IAB-node or the IAB-donor) and (ii) packets from a lower layer (such as the RLC layer) received via an IAB-compatible BH link to another device. As noted above, the BAP layer of a device is configured to manage routing of packets, including RLC channel assignment for an egress BH link.

In some implementations, handling by the BAP layer of a packet from an upper layer may be different than handling of a BAP packet from a lower layer. For example, the BAP layer may use a first configuration to process BAP packets from lower layers for forwarding to another device (e.g., when acting as a wireless relay), and the BAP layer may use a second configuration to process packets from upper layers for forwarding to another device (e.g., when processing packets of information from UEs wirelessly connected to the device).

Figure 8:
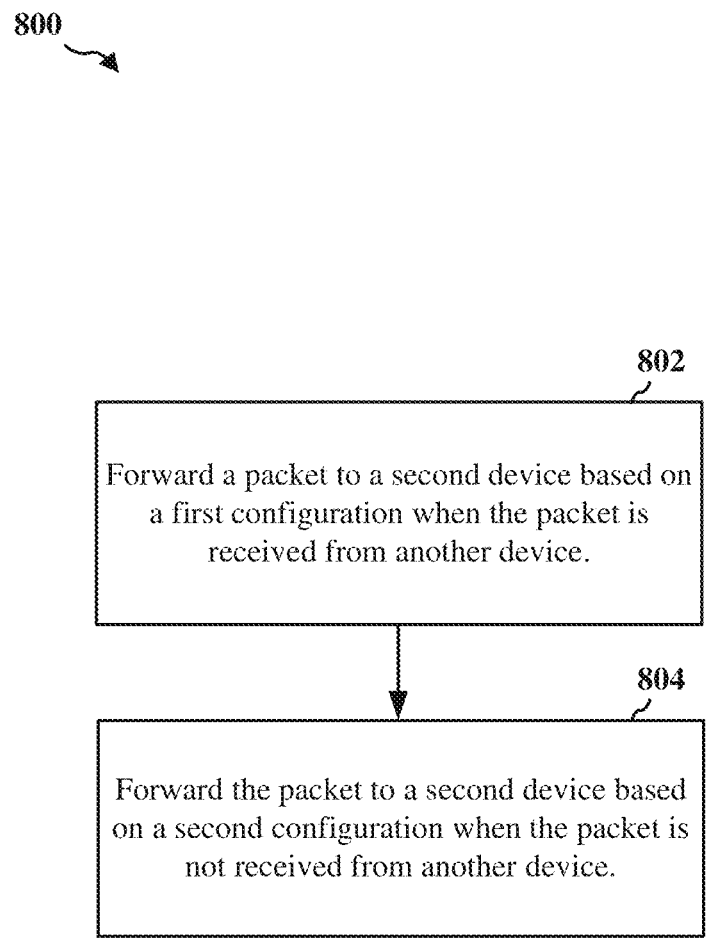
FIG. 8 is a flowchart of an example method of wireless communication.

FIG. 8 is a flowchart 800 of an example method of wireless communication. The method may be performed by a BS (e.g., the BS 102 in FIG. 1, the BS 310 in FIG. 3, the IAB-nodes 416-424 in FIG. 4, the IAB-nodes 502 and 504 in FIG. 5, and the IAB-nodes 614/714 and 634/734 in FIGS. 6 and 7). At 802, when a packet is received from another device, a first device may forward the packet to a second device based on a first configuration. For example, a packet received by an IAB-node from a child IAB-node may be forwarded to a parent IAB-node or an IAB-donor based on the first configuration. In some implementations, the first configuration is a means for the first device to determine the egress BH link (including, e.g., the egress RLC channel) for forwarding the packet. For example, the first configuration may be a mapping of ingress information and/or BAP packet information to egress information for forwarding the BAP packet. The packet received from another device may be in the RLC layer of the IAB-node. As such, the BAP layer of the IAB-node may retrieve the packet from the lower, RLC layer. Based on the packet being retrieved from the RLC layer (meaning the packet is received from another device), the first configuration is used by the BAP layer to determine the egress BH link (including, e.g., the egress RLC channel) for transmitting the packet.

At 804, when a packet is not received from another device, the first device may forward the packet to the second device based on a second configuration. For example, an information originating from a UE wirelessly connected to an IAB-node may be packetized and forwarded to a parent IAB-node or an IAB-donor based on the second configuration. In some implementations, the second configuration is a means for the first device to determine the egress BH link (including, e.g., the egress RLC channel) for forwarding the packet. For example, the second configuration may be a mapping of packet information (such as traffic information of the packet) to egress information for forwarding the packet. The packet generated by the IAB-node from information from a UE may be in an upper layer to the BAP layer of the IAB-node (such as a PDCP layer). As such, the BAP layer of the IAB-node may retrieve the packet from the upper layer. Based on the packet being retrieved from the upper layer (meaning the packet originates from the IAB-node), the second configuration is used by the BAP layer to determine the egress BH link (including, e.g., the egress RLC channel) for transmitting the packet.

In some implementations, the first configuration and the second configuration may be stored in a memory 376 (FIG. 3) coupled to a controller/processor 375 for implementing the BAP layer functionality. In this manner, performing the BAP layer functionality may include accessing the memory 376 for the first configuration or the second configuration. In some other implementations, the first configuration and/or the second configuration may be implemented in hardware, firmware, or a combination of hardware, firmware, and/or software.

Figure 9:
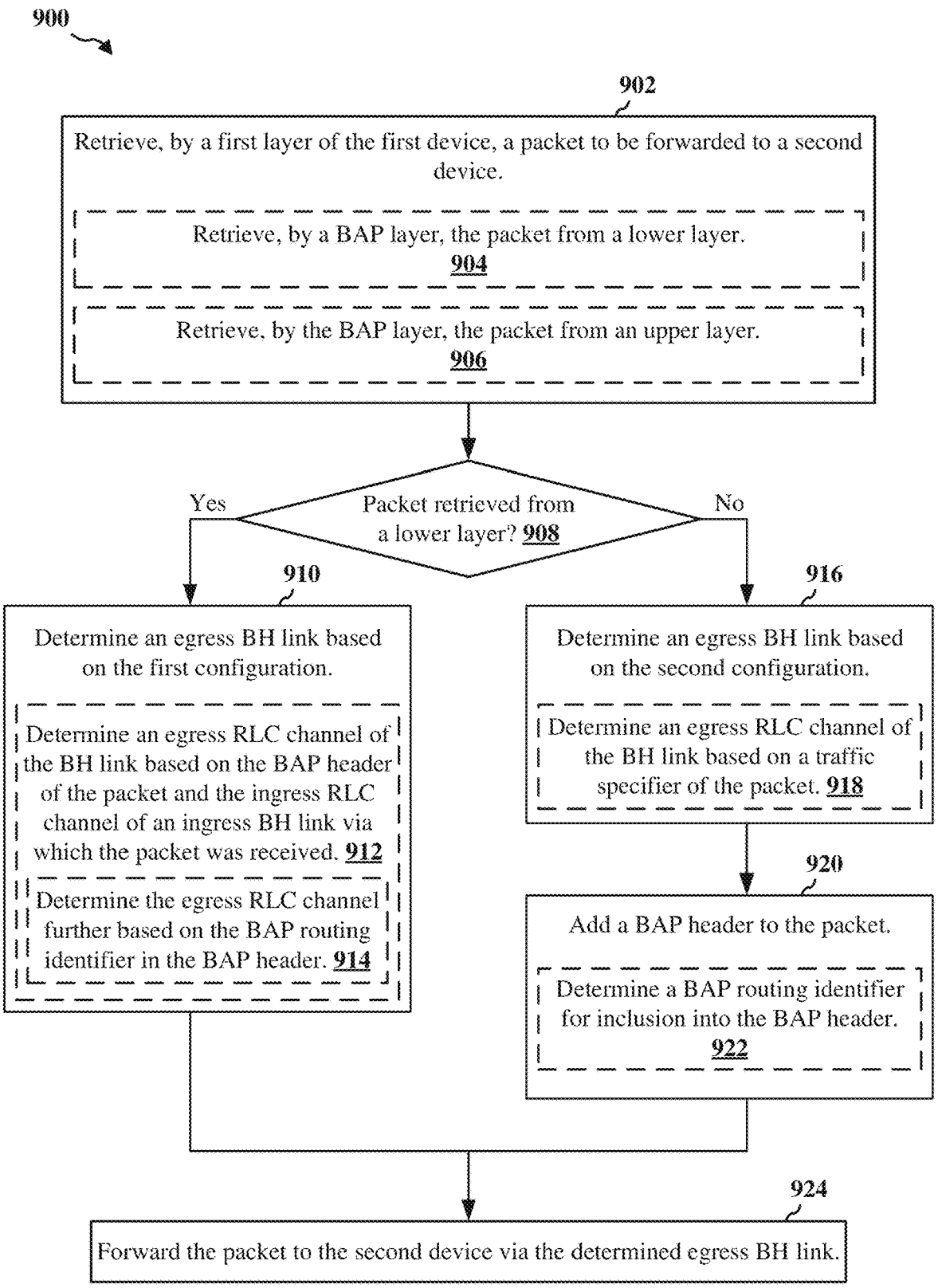
FIG. 9 is a flowchart of another example method of wireless communication.

FIG. 9 is a flowchart 900 of another example method of wireless communication. Flowchart 900 is an example expansion of the processes in flowchart 800 in FIG. 8 for performing wireless communications. The method may be performed by an IAB-node. A layer performing one or more operations (such as a BAP layer performing an operation) may refer to the device components implementing the layer functionality as performing the one or more operations. For example, one or more processors, integrated circuits, memory storing instructions for the layer functionality, a combination of hardware and software, or another suitable component of a device may be referred to as a layer of the device performing one or more operations.

At 902, a first layer of the IAB-node may retrieve a packet to be forwarded to a second device (such as another IAB-node or the IAB-donor). In some implementations, the BAP layer of the IAB-node may retrieve the packet from a lower layer of the IAB-node (904). For example, the BAP layer may retrieve a BAP packet from the RLC layer (with the BAP packet received via an ingress BH link with a third device, such as another IAB-node). In some other implementations, the BAP layer of the IAB-node may retrieve the packet from an upper layer of the IAB-node (906). For example, the BAP layer may retrieve a packet from an IP layer or a PDCP layer (with the BAP packet not being received via an ingress BH link with a third device).

If the packet is retrieved from a lower layer (908), the first layer may determine an egress BH link for forwarding the packet based on the first configuration (910). In some implementations, the BAP layer may determine an egress RLC channel of the egress BH link in response to retrieving the packet from the RLC layer of the IAB-node. Determining the egress RLC channel may be based on one or more of BAP header information of the BAP packet or the ingress RLC channel of the ingress BH link for receiving the packet (912). In some implementations, determining the egress RLC channel of the egress BH link may be further based on the BAP routing identifier included in the BAP header (914).

If the packet is not retrieved from a lower layer (908), the first layer may determine an egress BH link for forwarding the packet based on the second configuration (916). In some implementations, the BAP layer may determine an egress RLC channel of the egress BH link in response to retrieving the packet from the upper layer of the IAB-node (such as a PDCP layer). Determining the RLC channel may be based on a traffic specifier of the packet (918).

Since the packet is coming from an upper layer, the packet does not include a BAP header. The BAP layer may add a BAP header to the packet to prepare the packet for being transmitted over the egress BH link to the second device (920). In some implementations, the BAP layer may determine a BAP routing identifier based on the second configuration, and the BAP routing identifier is included in the BAP header added to the packet (922). The BAP routing identifier may include, e.g., a BAP address and/or a BAP path identifier. The BAP address may be a unique address to each device in, e.g., the IAB topology that may receive the packet. In this manner, each receiving device may determine the destination of the packet based on the BAP header. The BAP path identifier may be an indication of the path to be used for delivering the packet to another device. For example, the BAP path identifier may indicate the data radio bearer (DRB) for the packet, and the egress RLC channel may be based on the DRB. If the packet is received from the RLC layer, the packet (such as the packet's BAP header) may include the BAP path identifier for use in determining the egress RLC channel. In some implementations, determining the egress BH link (at 910 and 916) may also refer to determining which IAB-node (such as which parent IAB-node) is to be forwarded the packet.

After the egress BH link is determined (such as the egress RLC channel of the egress BH link being determined), the IAB-node may forward the packet to the second device via the determined egress BH link (924). For example, the BAP packet may be provided to the RLC layer, and the packet is formatted and provided to the PHY layer (via the MAC layer) for transmission by a transmitter of the IAB-node (which may include, e.g., the TX processor 316 providing one or more spatial streams 318TX to one or more antennas 320 of the BS 310 in FIG. 3 for transmission to another IAB-node or an IAB-donor). The components for transmitting may be referred to herein as a transmitter or a transceiver (if also configured for receiving from other devices). The transmitter is configured to transmit the packet to the second device based on the determined egress RLC channel of the egress BH link.

As noted above, the second configuration may be used by the BAP layer when a packet is retrieved from an upper layer (such as an IP layer or PDCP layer). The second configuration may be a mapping stored in a memory of the IAB-node (separate from the first configuration). In some implementations, the second configuration may map traffic information of packets to egress BH information so that the IAB-node may prepare the packet for transmission to another device.

FIG. 10 is a depiction of an example second configuration 1000 including one or more entries mapping a traffic specifier 1002 to egress BH information 1014. Since the packet is obtained from an upper layer, the packet may not include a BAP header including, e.g., a BAP address and a BAP path identifier (such as described with respect to FIG. 11). In this manner, the BAP layer may compare a traffic specifier for the packet to different traffic specifiers 1002 in the second configuration 1000. In some implementations, the traffic specifier 1002 may include a traffic type indicator 1004 and a traffic identifier 1006. The traffic type 1004 may be at least one of:

F1-U interface traffic between the IAB-node and the IAB-donor;
F1-C interface traffic between the IAB-node and the IAB-donor;
non-F1 interface traffic;
IPv6 traffic for the IAB-donor; or
IPv4 traffic for the IAB-donor.

To note, the F1-C interface traffic may also be divided into UE-associated or non-UE associated traffic for the traffic type entries. An example of non-F1 interface packets may be packets for Operations, Administration, and Maintenance (OAM) support. Turning to the traffic identifier 1006, the traffic identifier 1006 may include at least one of:

a GTP-U tunneling endpoint identifier (TEID);
a SCTP stream identifier;
a gNB-DU F1 application layer (F1-AP) protocol UE-associated identifier;
a gNB-DU identifier;
an IPv6 flow label value; or
an IP Differentiated Services Code Point (DSCP) value.

Each traffic identifier 1006 may be a unique space of a traffic type 1004. For example, the traffic identifier 1006 for a traffic type 1004 of F1-U interface traffic may be a GTP-U TEID since it is unique for F1-U interface traffic. In some implementations, the traffic identifier 1006 for a traffic type 1004 of F1-C interface traffic may be a SCTP stream identifier. In some other implementations, the traffic identifier 1006 may be different for F1-U interface traffic that is UE-associated or non-UE-associated. For example, the traffic identifier 1006 for a traffic type 1004 of non-UE-associated F1-U interface traffic may be a gNB-DU identifier (in the F1 application layer (F1-AP) interface). The traffic identifier 1006 for a traffic type 1004 of UE-associated F1-U interface traffic may be a gNB-DU F1-AP protocol identifier that is UE-associated.

As shown, the second configuration 1000 may include a plurality of entries 1020A-N with corresponding mappings 1022A-N. The BAP layer may compare the traffic specific for the packet (such as the traffic type and traffic identifier of the packet to be forwarded) to the entries 1020A-1020N to determine a match. The BAP layer may then obtain the egress BH information 1014 (such as determining the BH link 1016 and/or RLC channel 1018 of the BH link) from the matched entry's mapping. The device may then use the obtained egress BH information from the first configuration to transmit the packet to the second device.

As noted above, the BAP layer may add the BAP header to the packet. To do so, the BAP layer may determine the BAP routing identifier for inclusion into the BAP header. In some implementations, the mappings 1022A-1022N may include the BAP routing identifier 1008. In response to determining the mapping for the packet, the BAP layer may insert the corresponding BAP routing identifier 1008 into the BAP packet (such as in the BAP header). In some implementations, the BAP routing identifier 1008 includes a BAP address 1010 and a BAP path identifier 1012. The BAP address 1010 may be a unique identifier for destinations in the IAB topology. For example, the BAP address 1010 may be unique for each IAB-node for access and the IAB-donor for a one donor topology. The BAP path identifier 1012 may be information regarding the transmission path in the IAB topology of the packet (such as the DRB).

Referring back to 910 in FIG. 9, the ingress BH link (such as the ingress RLC channel of the ingress BH link used in receiving the packet) is known for the packet. In addition, the packet from the RLC layer may already include BAP header information (such as a BAP address and/or a BAP path identifier). In this manner, determining the egress BH link (such as the egress RLC channel) may be based on the ingress BH information and/or the BAP header information. For example, the first configuration may include one or more entries mapping ingress BH information and BAP header information to egress BH information.

FIG. 11 is a depiction of an example first configuration 1100 mapping ingress BH information 1102 and BAP header information 1108 to egress BH information 1116. In some implementations, the ingress BH information 1102 may include the ingress BH link 1104 and the ingress RLC channel 1106 of the BH link via which the packet is received. The BAP header information 1108 may include a BAP routing identifier 1110 indicating the routing of the BAP packet through the IAB topology. The BAP routing identifier 1110 may include a BAP address 1112 and a BAP path identifier 1114. As noted for FIG. 10, the BAP address 1112 may be a unique identifier for destinations in the IAB topology. For example, the BAP address 1112 may be unique for each IAB-node for access and the IAB-donor for a one donor topology. The BAP path identifier 1114 may be information regarding the transmission path in the IAB topology of the packet (such as the DRB). The egress BH information 1116 may include the egress BH link identifier 1118 and an egress RLC channel identifier 1120 indicating the egress RLC channel of the BH link for forwarding the packet.

As shown, the configuration may include a plurality of entries 1122A-N with corresponding mappings 1124A-N. The BAP layer may compare at least one of (i) the ingress BH information for the packet (such as the ingress BH link and the RLC channel identifier) or (ii) the BAP routing identifier from the BAP header (such as the stored BAP address and the BAP path identifier) to the entries 1122A-1122N to determine a match. The BAP layer may then obtain the egress BH information 1116 (such as the BH link and RLC channel identifier) from the matched entry's mapping. The device may then use the obtained egress BH information from the first configuration to forward the packet to the second device.

The BAP layer may be configured to select which of the first configuration or the second configuration to use based on the source of the packet (such as indicated by retrieving the packet from the RLC layer or an upper layer (such as the IP layer or PDCP layer)). In this manner, each device in the IAB topology may be configured to handle forwarding packets originating from other devices in the topology or originating from that device.

Regarding the IAB BH links, each BH link may support multiple RLC channels for Quality-of-Service (QoS) differentiation. As a result, a DRB for carrying the packet through the IAB topology may be mapped to a specific RLC channel for each hop through the IAB topology. Bearer mapping may refer to F1-U interface associations (also referred to as UE-bearers or DRB herein) being mapped to specific RLC channels of the BH for each hop. Each RLC channel is identified by a link-specific RLC channel identifier. If each UE-bearer is mapped to a separate BH RLC channel, the UE-bearer is associated with the unique link-specific RLC channel identifier. UE-bearers may be aggregated onto one or more BH RLC channels for each hop. For example, a first UE-bearer and a second UE-bearer may be aggregated and mapped to a first RLC channel for a first BH link between a first device and a second device and mapped to a second RLC channel for a second BH link between the second device and a third device. Each DRB is thus mapped to a BH RLC channel for each hop of a transmission through the IAB topology, which may be known by the nodes of the IAB topology (such as the IAB-nodes and the IAB-donor via the BAP layer configuration(s)).

Bearer remapping refers to a change in the mapping of RLC channels and DRBs from one hop (e.g., between a first IAB-node and a second IAB-node) to the next hop (e.g., between the second IAB-node and a third IAB-node or the IAB-donor) through the IAB topology. If bearer remapping is not supported, the RLC channel of each BH link may be predetermined for a DRB. In this manner, the ingress BH information and BAP routing identifier may be sufficient for matching a packet to one of the entries of the first configuration (as illustrated in the example first configuration 1100) for determining egress BH information, as the egress BH information is preconfigured for specific combinations of the ingress BH information and BAP routing identifier associated with the DRB. In some implementations, though, the BAP layer functionality may include bearer remapping.

Figure 12:
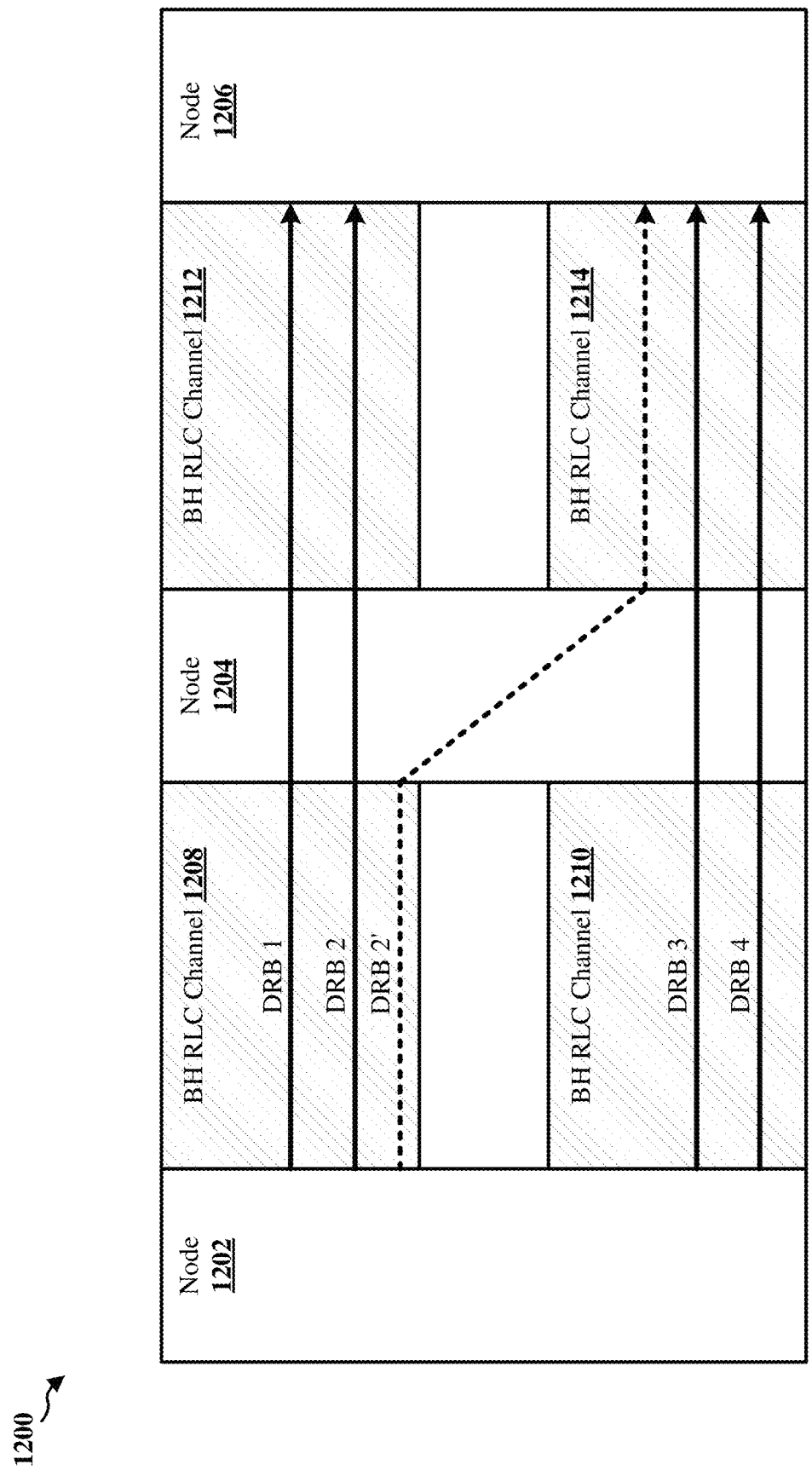
FIG. 12 is a depiction of an example bearer remapping.

FIG. 12 is a depiction of an example bearer remapping 1200. DRBs 1-4 are initially mapped to either the BH RLC channel 1208 or the BH RLC channel 1210 of the BH link between node 1202 and node 1204 and to either the BH RLC channel 1212 or the BH RLC channel 1214 of the BH link between node 1204 and node 1206. As shown, DRB 1 and DRB 2 are aggregated and initially mapped to BH RLC channel 1208 and to BH RLC channel 1212. DRB 3 and DRB 4 are aggregated and initially mapped to BH RLC channel 1210 and to BH RLC channel 1214.

The BAP layer of node 1204 may determine that DRB 2 is to be remapped from the BH RLC channel 1212 to the BH RLC Channel 1214 (as illustrated by remapped DRB 2'). For example, the node 1204 may determine to remap DRB 2 based on a QoS metric, the traffic type for the packet of DRB 2, or another indicator such that DRB 2 is to be aggregated with DRB 3 and DRB 4 on the BH RLC channel 1214. If the IAB topology is configured for bearer remapping, a device that may perform bearer remapping (such as node 1204 in FIG. 12) may include additional fields for entries in the first configuration (such as the example first configuration 1100 in FIG. 11). In some implementations, the additional fields may be a traffic specifier, which may include a traffic type and a traffic identifier (as described above with respect to the traffic specifier 1002 of the example second configuration 1000 in FIG. 10).

FIG. 13 is a depiction of an example first configuration 1300 that maps ingress BH information 1302 and BAP header information 1308 to egress BH information 1322. The first configuration 1300 may be used by a BAP layer configured for bearer remapping. Similar to the first configuration 1100 in FIG. 11, the ingress BH information 1302 may include a BH link identifier 1304 and an RLC channel identifier 1306, and the BAP header information 1308 includes a BAP routing identifier 1310 (which may include a BAP address 1312 and a BAP path identifier 1314, such as described above with respect to FIG. 11).

The BAP header information 1308 may also include a traffic specifier 1316. The traffic specifier 1316 may be similar to the traffic specifier 1002 in FIG. 10. In some implementations, the traffic specifier 1316 may include a traffic type indication 1318 and a traffic identifier 1320 (such as described above with respect to traffic type 1004 and traffic identifier 1006 in FIG. 10). The egress BH information 1322 may include the egress BH link 1324 and the egress RLC channel identifier 1326.

The BAP layer may compare the BH link information 1304 and the ingress RLC channel identifier 1306 for the packet, and one or more of the traffic type 1318, traffic identifier 1320, BAP address 1312, or BAP path identifier 1314 from the BAP header of the packet to the entries 1328A-1328N. The BAP layer may then obtain the egress BH link 1324 and egress RLC channel identifier 1326 from the mapping 1330A-1330N corresponding to the entry 1328A-1328N matched to the packet. In some implementations, a specific BAP address 1312 (and a specific BAP address 1112 of the first configuration 1100 in FIG. 11) may correspond to a plurality of entries in the configuration 1300 (or the configuration 110). Multiple entries may allow the BAP layer to perform operations related to load balancing or re-routing as a result of radio link failure (RLF).

In some implementations, if the DRB for the packet is not to be remapped, the BAP routing identifier 1310 from the BAP header is exclusively used (i.e., the traffic specifier 1316 is not matched). In some other implementations, the BAP layer may determine the remapping for the DRB is to be performed based on matching the traffic specifier 1316 of an entry corresponding to a mapping indicating a change in the initially mapped egress RLC channel identifier 1326. In some further implementations, the BAP routing identifier 1310 may not be used (or included) in the first configuration.

Figure 14:
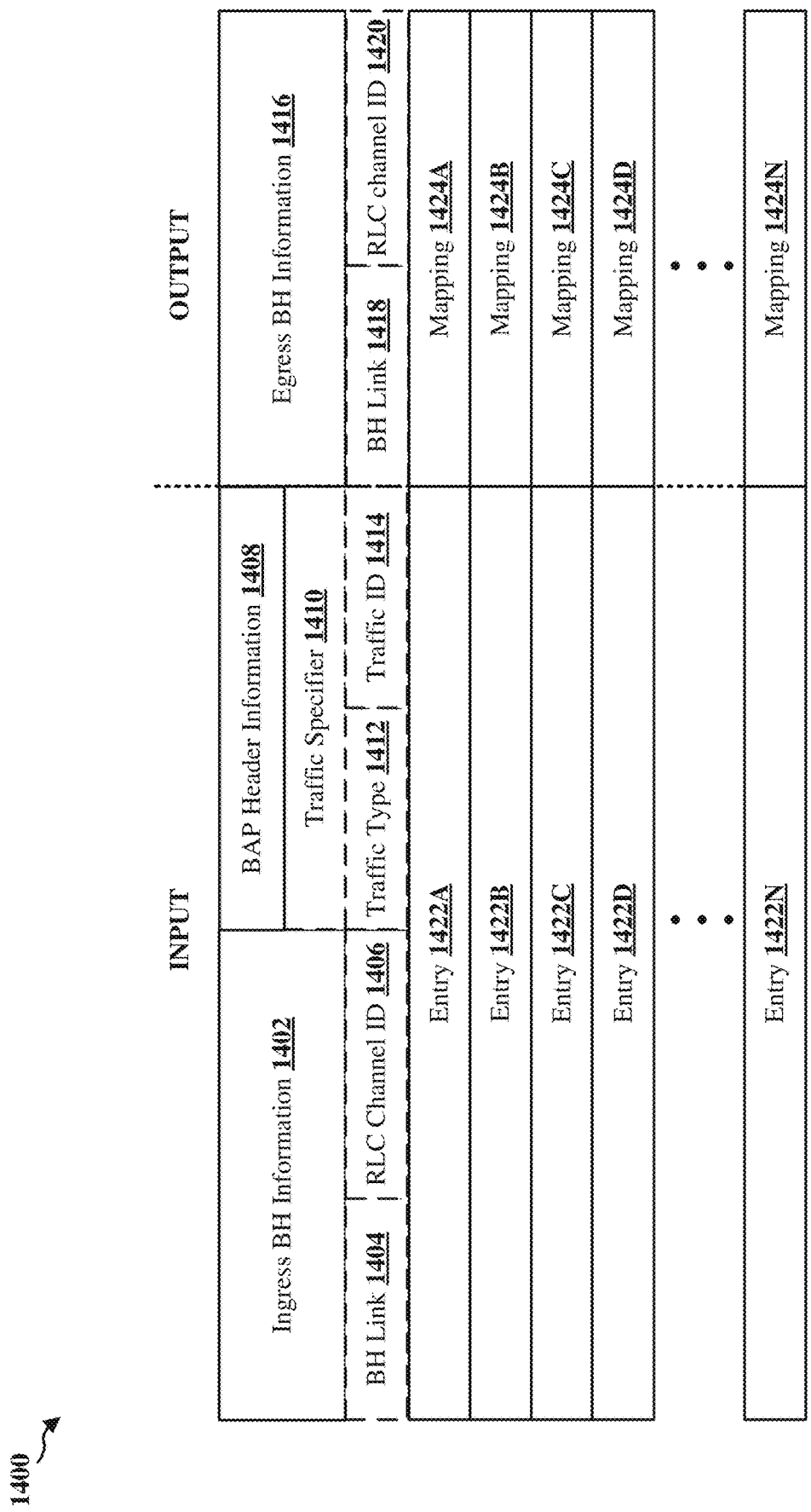
FIG. 14 is a depiction of another example first configuration that maps ingress backhaul information and BAP header information to egress backhaul information.

FIG. 14 is a depiction of another example first configuration 1400 that maps ingress BH information 1402 and BAP header information 1408 to egress BH information 1416. The first configuration 1400 is similar to the first configuration 1300 in FIG. 13, except the BAP Header Information 1408 does not include the BAP routing identifier 1310 (such as the BAP address 1312 and the BAP path identifier 1314) in FIG. 13. For the first configuration 1400 in FIG. 14, the BAP layer may match just the ingress BH information 1402 (such as the ingress BH link 1404 and ingress RLC channel identifier 1406) and the traffic specifier 1410 (such as the traffic type 1412 and the specific traffic type identifier 1414) between one of the entries 1422A-1422N and the packet. The BAP layer may then obtain the egress BH information 1416 (such as the egress BH link 1418 and the egress RLC channel 1420 of the egress BH link) from the mapping 1424A-1424N corresponding to the matched entry 1422A-1422N for the packet. The device may then use the obtained/determined egress BH information to forward the packet based on the first configuration 1400.

In some implementations, a first configuration and a second configuration may be enabled locally at each IAB-node and at the IAB-donor of the IAB topology. For example, the configurations may be tables (such as look-up tables (LUTs)), mappings, state machines, or other suitable means for determining egress BH information from ingress BH information and/or packet information. The configurations may be stored in a local memory of the device, configured in hardware (such as an integrated circuit) of the device, or be implemented by a combination of hardware and software of the device.

One or both of the first configuration and the second configuration may be a table or mapping provided by the IAB-donor to each IAB node coupled to the IAB-donor. For example, the IAB-donor may configure the first configuration and the second configuration and communicate the first and second configurations through the IAB topology. In some implementations, the BAP packet forwarding means (such as the configurations) are configured by the IAB-donor CU-CP, and the first and second configurations may be provided from the IAB-donor CU-CP to other devices via the RRC interface or the F1-AP interface. Other means for generating or providing the first and second configurations may be used (such as a separate wireline coupling, a wireless coupling using a different protocol, predetermined configurations uploaded to each device by a device outside the network or directly coupled to each device, etc.), and the present disclosure is not limited to the specific examples for providing the first and second configurations.

While the above examples describe an IAB-node typically as performing BAP layer functionality for forwarding packets, aspects of the BAP layer functionality may be implemented in the IAB-donor. The IAB-donor may be distributed into separate components. For example, referring back to FIGS. 6 and 7, the IAB-donor DU may be distributed from the IAB-donor CU-UP and the IAB-donor CU-CP.

Figure 15:
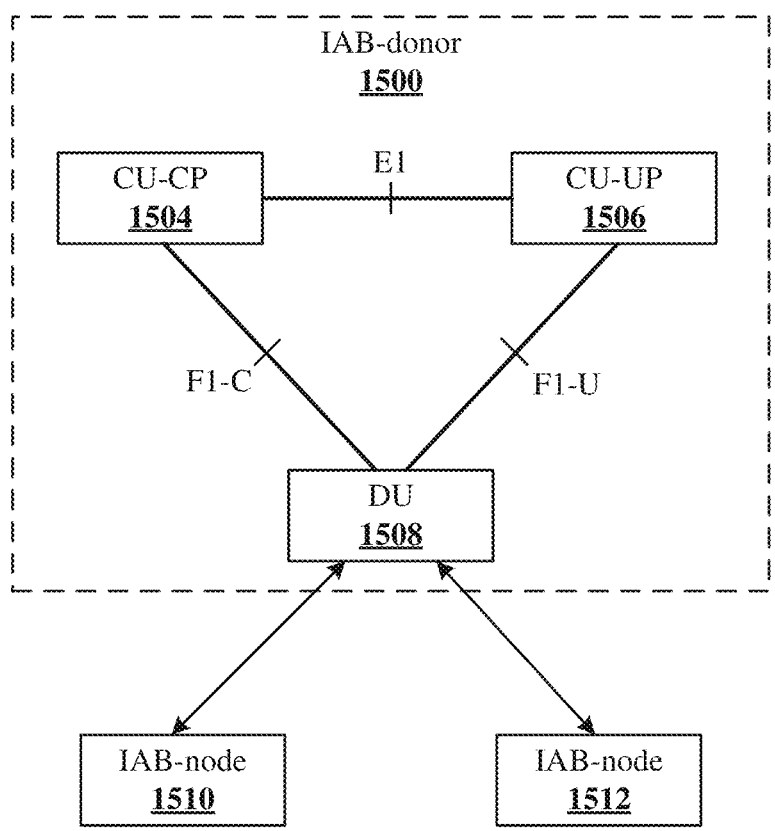
FIG. 15 is a block diagram of an example distributed IAB-donor.

FIG. 15 is a block diagram of an example distributed IAB-donor 1500. The distributed IAB-donor may be an example implementation of the IAB-donor 404 in FIG. 4, the IAB donor 506 in FIG. 5, the IAB donor in FIG. 6, or the IAB donor in FIG. 7. The distributed IAB-donor 1500 includes an IAB-donor CU-CP 1504, and IAB-donor CU-UP 1506, and an IAB-donor DU 1508.

The IAB-nodes 1510 and 1512 may be coupled to the IAB-donor DU 1508 via corresponding IAB-compatible wireless BH links. While two IAB-nodes are illustrated, any number of IAB-nodes may exist in the IAB topology for the distribute IAB-donor 1500. Furthermore, any number of UEs may be coupled to the IAB-donor 1500 or the IAB-nodes of the IAB topology. Additionally, while one DU 1508 is illustrated, the distributed IAB-donor 1500 may include any suitable number of DUs.

As illustrated, the CU-CP 1504 is coupled to the DU 1508 via an F1-C interface, and the CU-UP 1506 is coupled to the DU 1508 via an F1-U interface (which may be IP connections). The CU-CP 1504 and the CU-UP 1506 are coupled via an E1 interface. In some implementations, the DU 1508 may act as a device forwarding packets received from the CU-CP or the CU-UP for the IAB nodes of the IAB topology. In this manner, the DU 1508 may forward the packets to the IAB-node 1510 or the IAB-node 1512, thus acting as a wireless relay for the packets.

For example, referring back to FIG. 6, a downstream F1-U protocol traffic packet for forwarding onto the wireless BH may originate from the IAB-donor CU-UP 660. The IAB-donor CU-UP 660 may provide the packet to the IAB-donor DU 648 via the IP layer 672 coupled to the IP layer 658 by an IP connection. The BAP layer 652 of the IAB-donor DU 648 may retrieve the packet from the IP layer, insert a BAP header (including a BAP routing identifier) and determine the egress BH information (such as the RLC channel of the egress BH link) for forwarding the BAP packet to the IAB-node 634. In some implementations, the BAP layer 652 IAB-donor DU 648 may use a BAP configuration for determining the egress BH information for forwarding the BAP packet downstream.

Referring back to FIG. 15, in some implementations, the distributed IAB-donor CU-CP 1504 may provide, via the E1 interface (such as via E1-AP), an IP configuration to the distributed IAB-donor CU-UP 1506. The IP configuration may map traffic identifiers to one or more IP header values of the IP packet from the CU-UP 1506. In some implementations, the traffic identifier may be an identifier for F1-U protocol traffic since the packet originates from the CU-UP 1506. For example, an example traffic identifier in the IP configuration may be a GTP-U TEID. Referring back to FIG. 6, in some implementations, the IAB-donor CU-UP 660 compares the traffic identifier in a downstream packet (such as from the GTP-U header of the packet) to the traffic identifiers of the entries in the IP configuration from the IAB-donor CU-CP.

The IP header may indicate or include one or more of an IP version number (such as IPv4, IPv6, etc.), an IP address, an IPv6 flow label, and an IP DSCP value. In addition or alternative to the IP configuration providing, for an entry in the configuration, specific values for the above fields (such as IP version or IP address), the configuration may provide a mask or a range of values for one or more fields of the entry. For example, an IP configuration entry may include an IP address mask for an entry corresponding to a traffic identifier to prevent one or more IP addresses from being in the IP header of the packet corresponding to the traffic identifier. In another example, an IP configuration entry may include a range of IP DSCP values for an entry corresponding to a traffic identifier to indicate that the IP DSCP value of the IP header is to be set to one of the values in the range. In this manner, the CU-UP 1506 may be configured to perform wildcarding (partial matching) in determining the one or more values of the IP header based on the traffic identifier for the packet.

Figure 16:
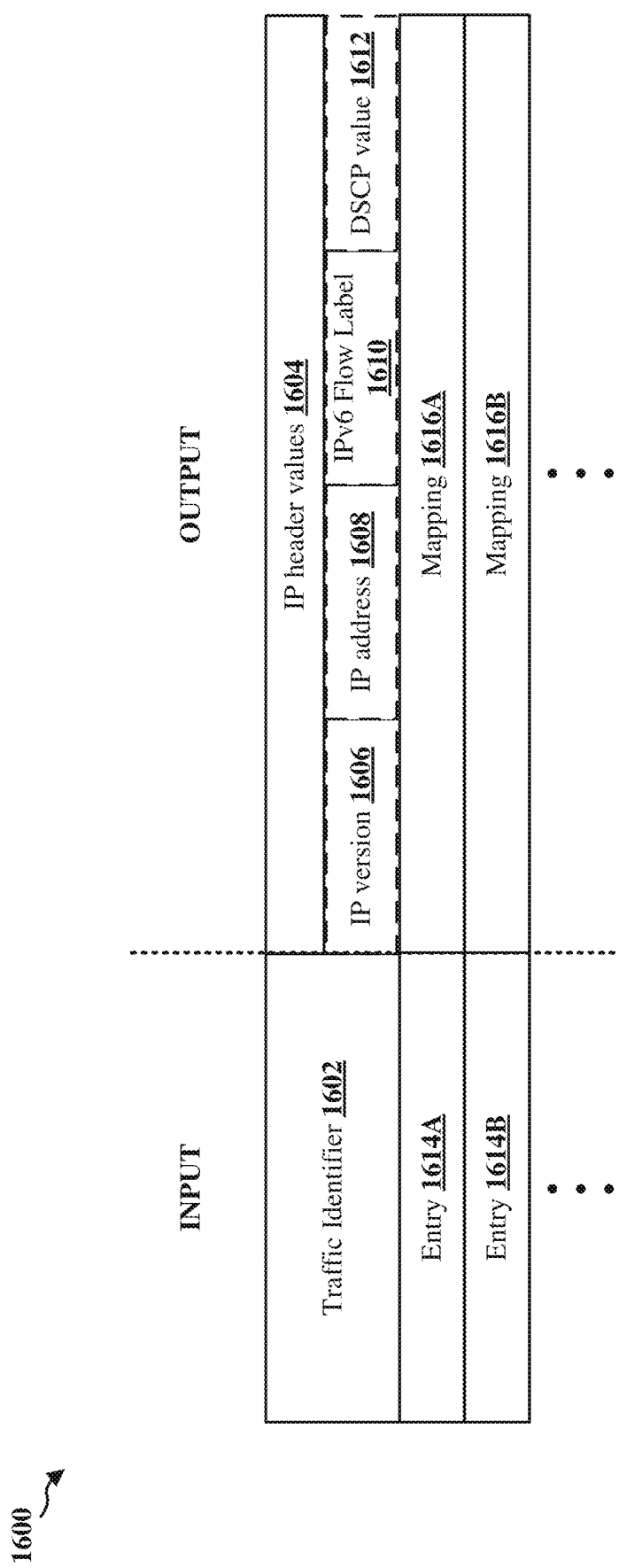
FIG. 16 is a depiction of an example internet protocol (IP) configuration mapping traffic identifiers to example IP header values.

FIG. 16 is a depiction of an example IP configuration 1600 mapping traffic identifiers 1602 to example IP header values 1604. The IP header values may include one or more of an IP version 1606, an IP address 1608, an IPv6 flow label 1610, or an IP DSCP value 1612. The traffic identifier for the packet may be compared to the entries 1614A, 1614B, etc., and the mapping corresponding to the entry matched to the packet (e.g., mapping 1616A or 1616B) may be used to obtain the IP header values 1604 for the IP packet to be provided to the IAB-donor DU. As noted above, the values 1604 may include a mask or range of values for one or more fields. In this manner, the DU 1508 receives one or more IP header values in the IP packet from the CU-UP 1506.

Referring back to FIG. 15, the distributed IAB-donor CU-CP 1504 may generate a BAP configuration and provide the BAP configuration to the DU 1508 via the F1-C interface. The BAP configuration may map sets of IP header values to routing information. The routing information may include a routing identifier (such as BAP routing identifier) and/or a next hop BH link identifier. The next hop BH link identifier may include one or more of an egress BH link identifier or an egress RLC channel identifier on the egress BH link. The DU 1508 may use the BAP configuration to determine routing information for forwarding the packet to an IAB-node 1510 or 1512.

Figure 17:
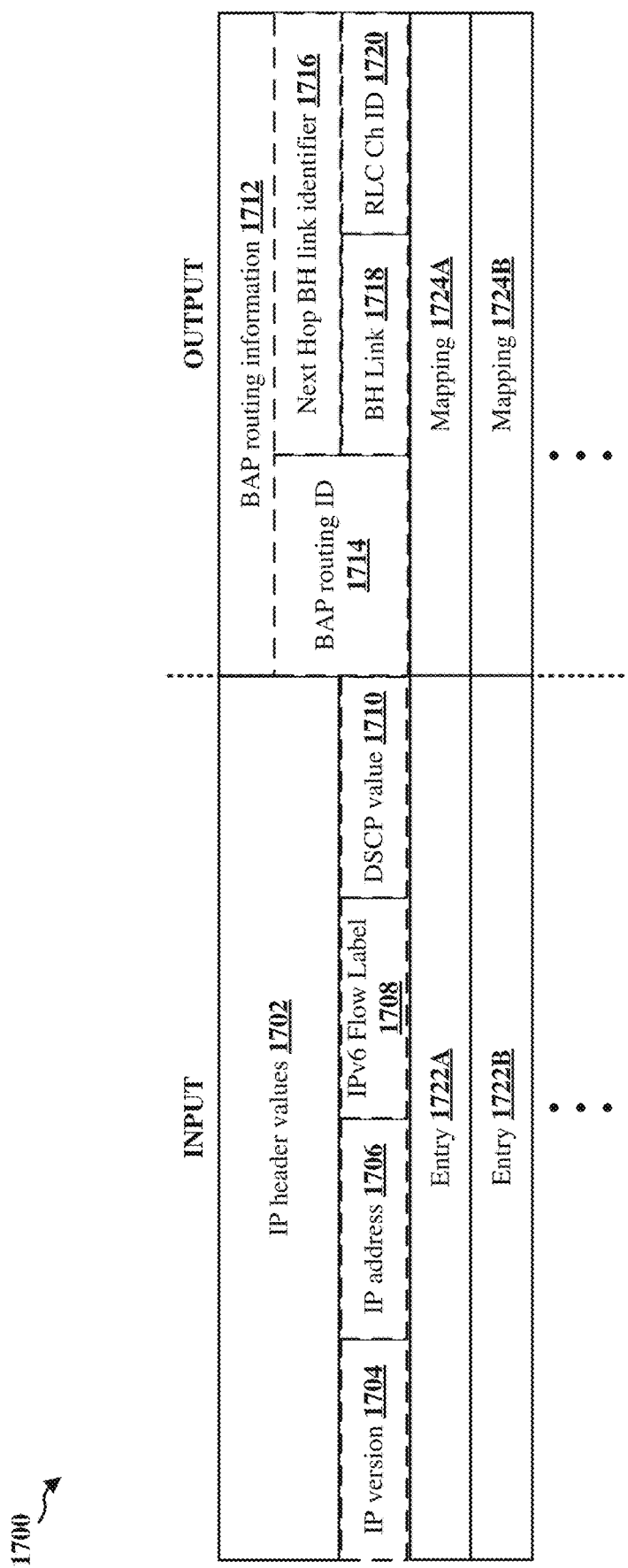
FIG. 17 is a depiction of an example BAP configuration mapping IP header values to BAP routing information for routing the packet from the IAB-donor distributed unit via the backhaul of the IAB topology.

FIG. 17 is a depiction of an example BAP configuration 1700 mapping IP header values 1702 to BAP routing information 1712 for routing the packet from the IAB-donor DU via the BH of the IAB topology. The IP header values 1702 may include one or more of an IP version 1704, an IP address 1706, an IPv6 flow label 1708, or an IP DSCP value 1710. The BAP routing information 1712 may include one or more of the BAP routing identifier 1714 or the next hop BH link identifier 1716. The next hop BH link identifier 1716 may include one or more of an egress BH link identifier 1718 or an egress RLC channel identifier 1720 on the egress BH link. The DU may compare the IP header values in the packet to the entries IP header values 1702 of the entries 1722A, 1722B, etc. In this manner, the DU may obtain the mapping corresponding to the entry matched to the packet (e.g., mapping 1724A or 1724B) which provides values for the BAP routing information 1712 for forwarding the packet downstream to an IAB-node. The IP header values 1702 may include a mask or range of values for one or more fields of an entry.

In some implementations, the DU inserts the BAP routing identifier from the matched mapping into the BAP header added to the packet. The DU may then forward the BAP packet based on the BAP configuration. While not shown in the BAP configuration 1700, the BAP configuration may include fields in the mappings for a traffic type and a traffic identifier (such as described herein). In some implementations, the DU may insert the traffic type and the traffic identifier from the matched mapping into the BAP header (e.g., together with the routing identifier). Example traffic types may include one or more of:
F1 protocol traffic;
F1-U protocol traffic;
F1-C protocol traffic;
Non-UE-associated F1-C protocol traffic;
UE-associated F1-C protocol traffic; or
Non-F1 protocol traffic.
Example traffic identifiers may include one or more of:
a GTP-U TEID;
a SCTP stream identifier (ID);
a gNB-DU F1-AP UE-associated traffic identifier;
a gNB-DU traffic identifier; or
a non-F1 generic traffic identifier.

As noted above, the different layer functionalities as described herein may be performed by one or more processors executing instructions stored in a memory, in hardware configured for performing the operations (such as one or more integrated circuits (ICs)), in software modules, or a combination of the above. However, any suitable means may be used for performing the operations described herein.

As described, aspects of the disclosure are regarding configuring a BAP layer of one or more devices in an IAB topology. Since a device may receive a packet for forwarding from a BH to another device, or the device may have a packet for forwarding that is not received from a BH to another device. As a result, the device may include two different configurations for forwarding the packet to the next device. For example, a first configuration may be used for forwarding a packet received from a BH to another device, and a second configuration may be used for forwarding a packet not received from a BH to another device.

Some other aspects of the disclosure are regarding configuring the DU and/or the CU-UP of the IAB-donor for packet forwarding through the IAB topology. In this manner, a distributed IAB-donor may be configured for processing and handling of packets (including BAP packets) in the IAB topology.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first Integrated Access and Backhaul (IAB) node coupled between a user equipment (UE) and an IAB-donor, comprising:
   retrieving, by a Backhaul Adaptation Protocol (BAP) layer of the first IAB-node, a first packet from an upper layer or a Radio Link Control (RLC) layer of the first IAB-node;
   determining an egress RLC channel of an egress backhaul (BH) link with a second device for transmitting the first packet based on:
      a first configuration in response to retrieving the first packet from the RLC layer; or
      a second configuration in response to retrieving the first packet from the upper layer; and
   transmitting the first packet to the second device via the egress RLC channel of the egress BH, wherein the second device is a second IAB-node or the IAB-donor.

2. The method of claim 1, wherein the first configuration includes a first entry mapping BAP header information of the first packet and an ingress RLC channel of an ingress BH link with a third device via which the first IAB-node receives the first packet from the third device to the egress RLC channel.

3. The method of claim 2, wherein the BAP header information includes a BAP routing identifier.

4. The method of claim 3, wherein the BAP routing identifier includes one or more of:
   a BAP address of the second device; or
   a BAP path identifier.

5. The method of claim 4, wherein determining the egress RLC channel based on the first configuration includes matching the BAP address and the BAP path identifier from the BAP header information and the ingress RLC channel of the ingress BH link in the first entry of the first configuration to determine the egress RLC channel of the egress BH link.

6. The method of claim 5, wherein determining the egress RLC channel based on the first configuration further includes matching a traffic specifier from the BAP header information in the first entry of the first configuration to determine the egress RLC channel of the egress BH link.

7. The method of claim 6, wherein the traffic specifier includes one or more of:
   a traffic type; or
   a traffic identifier.

8. The method of claim 7, wherein the traffic type indicates one of:
   F1 user plane (F1-U) protocol traffic between the first IAB-node and the IAB-donor;
   F1 control plane (F1-C) protocol traffic between the first IAB-node and the IAB-donor;
   non-F1 protocol traffic;
   Internet Protocol version 6 (IPv6) traffic; or
   Internet Protocol version 4 (IPv4) traffic.

9. The method of claim 8, wherein the F1-C protocol traffic is UE-associated or non-UE-associated.

10. The method of claim 7, wherein the traffic identifier includes one of:
   a General Packet Radio Service (GPRS) Tunneling Protocol (GTP) for user data (GTP-U) tunneling endpoint identifier (TEID);
   a Stream Control Transmission Protocol (SCTP) stream identifier;
   a gNodeB distributed unit (gNB-DU) F1 application layer (F1-AP) protocol UE-associated identifier;
   a gNB-DU identifier;
   an IPv6 flow label value; or
   an Internet Protocol (IP) Differentiated Services Code Point (DSCP) value.

11. The method of claim 6, further comprising:
   retrieving, from the RLC layer, a second packet to be forwarded to the second device, wherein:
      the first packet is associated with a first user equipment bearer (UE-bearer);
      the second packet is associated with a second UE-bearer;
      the first UE-bearer and the second UE-bearer are aggregated onto the ingress RLC channel when received from the third device; and
      the second UE-bearer is initially mapped to the egress RLC channel with the first UE-bearer; and remapping the second UE-bearer to a second egress RLC channel, wherein the first packet is transmitted via the egress RLC channel and the second packet is transmitted via the second egress RLC channel to the second device.

12. The method of claim 1, wherein the second configuration includes an entry mapping a traffic specifier of the first packet to the egress RLC channel of the egress BH link.

13. The method of claim 12, wherein the traffic specifier includes one or more of:
a traffic type; or
a traffic identifier.

14. The method of claim 13, wherein determining the egress RLC channel based on the second configuration includes matching the traffic type and the traffic identifier of the first packet to the entry of the second configuration mapping to the egress RLC channel of the egress BH link.

15. The method of claim 14, further comprising:
determining a BAP routing identifier for the first packet based on the second configuration in response to retrieving the first packet from the upper layer, wherein the entry of the second configuration further maps the traffic type and the traffic identifier of the first packet to the BAP routing identifier; and
adding a BAP header including the BAP routing identifier to the first packet before transmitting the first packet to the second device.

16. The method of claim 15, wherein the BAP routing identifier includes one or more of:
a BAP address of a device to receive the packet; or
a BAP path identifier.

17. The method of claim 13, wherein the traffic type indicates one of:
F1 user plane (F1-U) protocol traffic between the first IAB-node and the IAB-donor;
non-UE associated F1 control plane (F1-C) protocol traffic between the first IAB-node and the IAB-donor;
UE associated F1-C protocol traffic between the first IAB-node and the IAB-donor; or
non-F1 protocol traffic.

18. The method of claim 17, wherein the traffic identifier includes, for a traffic type indicating F1-U protocol traffic, a General Packet Radio Service (GPRS) Tunneling Protocol (GTP) for user data (GTP-U) tunneling endpoint identifier (TEID).

19. The method of claim 17, wherein the traffic identifier includes, for a traffic type indicating non-UE associated F1-C protocol traffic, one of:
a Stream Control Transmission Protocol (SCTP) stream identifier; or
a gNodeB distributed unit (gNB-DU) identifier in the F1 application layer (F1-AP).

20. The method of claim 17, wherein the traffic identifier includes, for a traffic type indicating UE associated F1-C protocol traffic, one of:
a Stream Control Transmission Protocol (SCTP) stream identifier; or
a gNodeB distributed unit (gNB-DU) F1 application layer (F1-AP) protocol UE-associated identifier.

21. The method of claim 1, further comprising:
receiving one or more of the first configuration or the second configuration generated by the IAB-donor; and
storing the one or more configurations in a memory of the first IAB-node, wherein determining the egress RLC channel includes accessing the one or more configurations in the memory by one or more processors implementing the BAP layer.

22. An Integrated Access and Backhaul (IAB) node coupled between a user equipment (UE) and an IAB-donor, comprising:
one or more processors to implement:
a Radio Link Control (RLC) layer;
a Backhaul Adaptation Protocol (BAP) layer to:
retrieve a first packet from an upper layer or the RLC layer of the IAB-node; and
determine an egress RLC channel of an egress backhaul (BH) link with a second device for transmitting the first packet based on:
a first configuration in response to retrieving the first packet from the RLC layer; or
a second configuration in response to retrieving the first packet from the upper layer; and
one or more transmitters to transmit the first packet to the second device via the egress RLC channel of the egress BH link with the second device, wherein the second device is a second IAB-node or the IAB-donor.

23. The IAB-node of claim 22, wherein the first configuration includes a first entry mapping BAP header information of the first packet and an ingress RLC channel of an ingress BH link with a third device via which the IAB-node receives the first packet from the third device to the egress RLC channel.

24. The IAB-node of claim 23, wherein the BAP header information includes a BAP routing identifier.

25. The IAB-node of claim 24, wherein the BAP routing identifier includes one or more of:
a BAP address of the second device; or
a BAP path identifier.

26. The IAB-node of claim 25, wherein determining the egress RLC channel based on the first configuration includes matching the BAP address and the BAP path identifier from the BAP header information and the ingress RLC channel of the ingress BH link in the first entry of the first configuration to determine the egress RLC channel of the egress BH link.

27. The IAB-node of claim 26, wherein determining the egress RLC channel based on the first configuration further includes matching a traffic specifier from the BAP header information in the first entry of the first configuration to determine the egress RLC channel of the egress BH link.

28. The IAB-node of claim 27, wherein the traffic specifier includes one or more of:
a traffic type; or
a traffic identifier.

29. The IAB-node of claim 28, wherein the traffic type indicates one of:
F1 user plane (F1-U) protocol traffic between the IAB-node and the IAB-donor;
F1 control plane (F1-C) protocol traffic between the IAB-node and the IAB-donor;
non-F1 protocol traffic;
Internet Protocol version 6 (IPv6) traffic; or
Internet Protocol version 4 (IPv4) traffic.

30. The IAB-node of claim 29, wherein the F1-C protocol traffic is UE-associated or non-UE-associated.

31. The IAB-node of claim 28, wherein the traffic identifier includes one of:
a General Packet Radio Service (GPRS) Tunneling Protocol (GTP) for user data (GTP-U) tunneling endpoint identifier (TEID);
a Stream Control Transmission Protocol (SCTP) stream identifier;

a gNodeB distributed unit (gNB-DU) F1 application layer (F1-AP) protocol UE-associated identifier;
a gNB-DU identifier;
an IPv6 flow label value; or
an Internet Protocol (IP) Differentiated Services Code Point (DSCP) value.

32. The IAB-node of claim 27, wherein the BAP layer, implemented by the one or more processors, is to further:
retrieve, from the RLC layer, a second packet to be forwarded to the second device, wherein:
the first packet is associated with a first user equipment bearer (UE-bearer);
the second packet is associated with a second UE-bearer;
the first UE-bearer and the second UE-bearer are aggregated onto the ingress RLC channel when received from the third device; and
the second UE-bearer is initially mapped to the egress RLC channel with the first UE-bearer; and
remap the second UE-bearer to a second egress RLC channel, wherein the first packet is transmitted via the egress RLC channel and the second packet is transmitted via the second egress RLC channel to the second device.

33. The IAB-node of claim 22, wherein the second configuration includes an entry mapping a traffic specifier of the first packet to the egress RLC channel of the egress BH link.

34. The IAB-node of claim 33, wherein the traffic specifier includes one or more of:
a traffic type; or
a traffic identifier.

35. The IAB-node of claim 34, wherein determining the egress RLC channel based on the second configuration includes matching the traffic type and the traffic identifier of the first packet to the entry of the second configuration mapping to the egress RLC channel of the egress BH link.

36. The IAB-node of claim 35, wherein the BAP layer, implemented by the one or more processors, is to further:
determine a BAP routing identifier for the first packet based on the second configuration in response to retrieving the first packet from the upper layer, wherein the entry of the second configuration further maps the traffic type and the traffic identifier of the first packet to the BAP routing identifier; and
add a BAP header including the BAP routing identifier to the first packet before transmitting the first packet to the second device.

37. The IAB-node of claim 36, wherein the BAP routing identifier includes one or more of:
a BAP address of a device to receive the packet; or
a BAP path identifier.

38. The IAB-node of claim 34, wherein the traffic type indicates one of:
F1 user plane (F1-U) protocol traffic between the IAB-node and the IAB-donor;
non-UE associated F1 control plane (F1-C) protocol traffic between the IAB-node and the IAB-donor;
UE associated F1-C protocol traffic between the IAB-node and the IAB-donor; or
non-F1 protocol traffic.

39. The IAB-node of claim 38, wherein the traffic identifier includes, for a traffic type indicating F1-U protocol traffic, a General Packet Radio Service (GPRS) Tunneling Protocol (GTP) for user data (GTP-U) tunneling endpoint identifier (TEID).

40. The IAB-node of claim 38, wherein the traffic identifier includes, for a traffic type indicating non-UE associated F1-C protocol traffic, one of:
a Stream Control Transmission Protocol (SCTP) stream identifier; or
a gNodeB distributed unit (gNB-DU) identifier in the F1 application layer (F1-AP).

41. The IAB-node of claim 38, wherein the traffic identifier includes, for a traffic type indicating UE associated F1-C protocol traffic, one of:
a Stream Control Transmission Protocol (SCTP) stream identifier; or
a gNodeB distributed unit (gNB-DU) F1 application layer (F1-AP) protocol UE-associated identifier.

42. The IAB-node of claim 22, further comprising:
one or more receivers to receive one or more of the first configuration or the second configuration generated by the IAB-donor; and
a memory to store the one or more configurations, wherein the BAP layer to determining the egress RLC channel includes the one or more processors that implement the BAP layer accessing the one or more configurations in the memory.

43. A non-transitory computer readable medium storing instructions that, when executed by one or more processors of an Integrated Access and Backhaul (IAB) node coupled between a user equipment (UE) and an IAB-donor, cause the IAB-node to:
retrieve, by a Backhaul Adaptation Protocol (BAP) layer of the IAB-node, a first packet from an upper layer or a Radio Link Control (RLC) layer of the IAB-node;
determine an egress RLC channel of an egress backhaul (BH) link with a second device for transmitting the first packet based on:
a first configuration in response to retrieving the first packet from the RLC layer; or
a second configuration in response to retrieving the first packet from the upper layer; and
transmit the first packet to the second device via the egress RLC channel of the egress BH, wherein the second device is a second IAB-node or the IAB-donor.

44. The computer readable medium of claim 43, wherein the first configuration includes a first entry mapping BAP header information of the first packet and an ingress RLC channel of an ingress BH link with a third device via which the IAB-node receives the first packet from the third device to the egress RLC channel.

45. The computer readable medium of claim 44, wherein the BAP header information includes a BAP routing identifier.

46. The computer readable medium of claim 45, wherein the BAP routing identifier includes one or more of:
a BAP address of the second device; or
a BAP path identifier.

47. The computer readable medium of claim 46, wherein determining the egress RLC channel based on the first configuration includes matching the BAP address and the BAP path identifier from the BAP header information and the ingress RLC channel of the ingress BH link in the first entry of the first configuration to determine the egress RLC channel of the egress BH link.

48. The computer readable medium of claim 47, wherein determining the egress RLC channel based on the first configuration further includes matching a traffic specifier from the BAP header information in the first entry of the first configuration to determine the egress RLC channel of the egress BH link.

49. The computer readable medium of claim 48, wherein the traffic specifier includes one or more of:
  a traffic type; or
  a traffic identifier.

50. The computer readable medium of claim 49, wherein the traffic type indicates one of:
  F1 user plane (F1-U) protocol traffic between the IAB-node and the IAB-donor;
  F1 control plane (F1-C) protocol traffic between the IAB-node and the IAB-donor;
  non-F1 protocol traffic;
  Internet Protocol version 6 (IPv6) traffic; or
  Internet Protocol version 4 (IPv4) traffic.

51. The computer readable medium of claim 50, wherein the F1-C protocol traffic is UE-associated or non-UE-associated.

52. The computer readable medium of claim 49, wherein the traffic identifier includes one of:
  a General Packet Radio Service (GPRS) Tunneling Protocol (GTP) for user data (GTP-U) tunneling endpoint identifier (TEID);
  a Stream Control Transmission Protocol (SCTP) stream identifier;
  a gNodeB distributed unit (gNB-DU) F1 application layer (F1-AP) protocol UE-associated identifier;
  a gNB-DU identifier;
  an IPv6 flow label value; or
  an Internet Protocol (IP) Differentiated Services Code Point (DSCP) value.

53. The computer readable medium of claim 48, wherein execution of the instructions further causes the IAB-node to:
  retrieve, from the RLC layer, a second packet to be forwarded to the second device, wherein:
    the first packet is associated with a first user equipment bearer (UE-bearer);
    the second packet is associated with a second UE-bearer;
    the first UE-bearer and the second UE-bearer are aggregated onto the ingress RLC channel when received from the third device; and
    the second UE-bearer is initially mapped to the egress RLC channel with the first UE-bearer; and
  remap the second UE-bearer to a second egress RLC channel, wherein the first packet is transmitted via the egress RLC channel and the second packet is transmitted via the second egress RLC channel to the second device.

54. The computer readable medium of claim 43, wherein the second configuration includes an entry mapping a traffic specifier of the first packet to the egress RLC channel of the egress BH link.

55. The computer readable medium of claim 54, wherein the traffic specifier includes one or more of:
  a traffic type; or
  a traffic identifier.

56. The computer readable medium of claim 55, wherein determining the egress RLC channel based on the second configuration includes matching the traffic type and the traffic identifier of the first packet to the entry of the second configuration mapping to the egress RLC channel of the egress BH link.

57. The computer readable medium of claim 56, wherein execution of the instructions further causes the IAB-node to:
  determine a BAP routing identifier for the first packet based on the second configuration in response to retrieving the first packet from the upper layer, wherein the entry of the second configuration further maps the traffic type and the traffic identifier of the first packet to the BAP routing identifier; and
  add a BAP header including the BAP routing identifier to the first packet before transmitting the first packet to the second device.

58. The computer readable medium of claim 57, wherein the BAP routing identifier includes one or more of:
  a BAP address of a device to receive the packet; or
  a BAP path identifier.

59. The computer readable medium of claim 55, wherein the traffic type indicates one of:
  F1 user plane (F1-U) protocol traffic between the IAB-node and the IAB-donor;
  non-UE associated F1 control plane (F1-C) protocol traffic between the IAB-node and the IAB-donor;
  UE associated F1-C protocol traffic between the IAB-node and the IAB-donor; or
  non-F1 protocol traffic.

60. The computer readable medium of claim 59, wherein the traffic identifier includes, for a traffic type indicating F1-U protocol traffic, a General Packet Radio Service (GPRS) Tunneling Protocol (GTP) for user data (GTP-U) tunneling endpoint identifier (TEID).

61. The computer readable medium of claim 59, wherein the traffic identifier includes, for a traffic type indicating non-UE associated F1-C protocol traffic, one of:
  a Stream Control Transmission Protocol (SCTP) stream identifier; or
  a gNodeB distributed unit (gNB-DU) identifier in the F1 application layer (F1-AP).

62. The computer readable medium of claim 59, wherein the traffic identifier includes, for a traffic type indicating UE associated F1-C protocol traffic, one of:
  a Stream Control Transmission Protocol (SCTP) stream identifier; or
  a gNodeB distributed unit (gNB-DU) F1 application layer (F1-AP) protocol UE-associated identifier.

63. The computer readable medium of claim 43, wherein execution of the instructions further causes the IAB-node to:
  receive one or more of the first configuration or the second configuration generated by the IAB-donor; and
  store the one or more configurations in a memory of the IAB-node, wherein determining the egress RLC channel includes accessing the one or more configurations in the memory by one or more processors implementing the BAP layer.

64. An Integrated Access and Backhaul (IAB) node coupled between a user equipment (UE) and an IAB-donor, comprising:
  means for retrieving a first packet from an upper layer to a Backhaul Adaptation Protocol (BAP) layer or a Radio Link Control (RLC) layer of the IAB-node;
  means for determining an egress RLC channel of an egress backhaul (BH) link with a second device for transmitting the first packet based on:
    a first configuration in response to retrieving the first packet from the RLC layer; or
    a second configuration in response to retrieving the first packet from the upper layer; and
  means for transmitting the first packet to the second device via the egress RLC channel of the egress BH, wherein the second device is a second IAB-node or the IAB-donor.

65. The IAB-node of claim 64, wherein the first configuration includes a first entry mapping BAP header information of the first packet and an ingress RLC channel of an ingress BH link with a third device via which the IAB-node receives the first packet from the third device to the egress RLC channel.

66. The IAB-node of claim 65, wherein the BAP header information includes a BAP routing identifier.

67. The IAB-node of claim 66, wherein the BAP routing identifier includes one or more of:
a BAP address of the second device; or
a BAP path identifier.

68. The IAB-node of claim 67, wherein determining the egress RLC channel based on the first configuration includes matching the BAP address and the BAP path identifier from the BAP header information and the ingress RLC channel of the ingress BH link in the first entry of the first configuration to determine the egress RLC channel of the egress BH link.

69. The IAB-node of claim 68, wherein determining the egress RLC channel based on the first configuration further includes matching a traffic specifier from the BAP header information in the first entry of the first configuration to determine the egress RLC channel of the egress BH link.

70. The IAB-node of claim 69, wherein the traffic specifier includes one or more of:
a traffic type; or
a traffic identifier.

71. The IAB-node of claim 70, wherein the traffic type indicates one of:
F1 user plane (F1-U) protocol traffic between the IAB-node and the IAB-donor;
F1 control plane (F1-C) protocol traffic between the IAB-node and the IAB-donor;
non-F1 protocol traffic;
Internet Protocol version 6 (IPv6) traffic; or
Internet Protocol version 4 (IPv4) traffic.

72. The IAB-node of claim 71, wherein the F1-C protocol traffic is UE-associated or non-UE-associated.

73. The IAB-node of claim 70, wherein the traffic identifier includes one of:
a General Packet Radio Service (GPRS) Tunneling Protocol (GTP) for user data (GTP-U) tunneling endpoint identifier (TEID);
a Stream Control Transmission Protocol (SCTP) stream identifier;
a gNodeB distributed unit (gNB-DU) F1 application layer (F1-AP) protocol UE-associated identifier;
a gNB-DU identifier;
an IPv6 flow label value; or
an Internet Protocol (IP) Differentiated Services Code Point (DSCP) value.

74. The IAB-node of claim 69, further comprising:
means for retrieving, from the RLC layer, a second packet to be forwarded to the second device, wherein:
the first packet is associated with a first user equipment bearer (UE-bearer);
the second packet is associated with a second UE-bearer;
the first UE-bearer and the second UE-bearer are aggregated onto the ingress RLC channel when received from the third device; and
the second UE-bearer is initially mapped to the egress RLC channel with the first UE-bearer; and
means for remapping the second UE-bearer to a second egress RLC channel, wherein the first packet is transmitted via the egress RLC channel and the second packet is transmitted via the second egress RLC channel to the second device.

75. The IAB-node of claim 64, wherein the second configuration includes an entry mapping a traffic specifier of the first packet to the egress RLC channel of the egress BH link.

76. The IAB-node of claim 75, wherein the traffic specifier includes one or more of:
a traffic type; or
a traffic identifier.

77. The IAB-node of claim 76, wherein determining the egress RLC channel based on the second configuration includes matching the traffic type and the traffic identifier of the first packet to the entry of the second configuration mapping to the egress RLC channel of the egress BH link.

78. The IAB-node of claim 77, further comprising:
means for determining a BAP routing identifier for the first packet based on the second configuration in response to retrieving the first packet from the upper layer, wherein the entry of the second configuration further maps the traffic type and the traffic identifier of the first packet to the BAP routing identifier; and
means for adding a BAP header including the BAP routing identifier to the first packet before transmitting the first packet to the second device.

79. The IAB-node of claim 78, wherein the BAP routing identifier includes one or more of:
a BAP address of a device to receive the packet; or
a BAP path identifier.

80. The IAB-node of claim 76, wherein the traffic type indicates one of:
F1 user plane (F1-U) protocol traffic between the IAB-node and the IAB-donor;
non-UE associated F1 control plane (F1-C) protocol traffic between the IAB-node and the IAB-donor;
UE associated F1-C protocol traffic between the IAB-node and the IAB-donor; or
non-F1 protocol traffic.

81. The IAB-node of claim 80, wherein the traffic identifier includes, for a traffic type indicating F1-U protocol traffic, a General Packet Radio Service (GPRS) Tunneling Protocol (GTP) for user data (GTP-U) tunneling endpoint identifier (TEID).

82. The IAB-node of claim 80, wherein the traffic identifier includes, for a traffic type indicating non-UE associated F1-C protocol traffic, one of:
a Stream Control Transmission Protocol (SCTP) stream identifier; or
a gNodeB distributed unit (gNB-DU) identifier in the F1 application layer (F1-AP).

83. The IAB-node of claim 80, wherein the traffic identifier includes, for a traffic type indicating UE associated F1-C protocol traffic, one of:
a Stream Control Transmission Protocol (SCTP) stream identifier; or
a gNodeB distributed unit (gNB-DU) F1 application layer (F1-AP) protocol UE-associated identifier.

84. The IAB-node of claim 64, further comprising:
means for receiving one or more of the first configuration or the second configuration generated by the IAB-donor; and
means for storing the one or more configurations, wherein determining the egress RLC channel includes accessing the one or more configurations.

* * * * *